(12) United States Patent
Niitani et al.

(10) Patent No.: US 7,645,830 B2
(45) Date of Patent: Jan. 12, 2010

(54) POLYMER, CROSSLINKED POLYMER, COMPOSITION FOR SOLID POLYMER ELECTROLYTE, SOLID POLYMER ELECTROLYTE, AND ADHESIVE COMPOSITION

(75) Inventors: Takeshi Niitani, Ichihara (JP); Masato Amaike, Ichihara (JP); Mikiya Shimada, Chiba (JP); Kiyoshi Kawamura, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 346 days.

(21) Appl. No.: 11/795,783

(22) PCT Filed: Jan. 18, 2006

(86) PCT No.: PCT/JP2006/300599

§ 371 (c)(1),
(2), (4) Date: Jul. 19, 2007

(87) PCT Pub. No.: WO2006/077855

PCT Pub. Date: Jul. 27, 2006

(65) Prior Publication Data

US 2008/0166636 A1    Jul. 10, 2008

(30) Foreign Application Priority Data

Jan. 21, 2005 (JP) ............................. 2005-014195

(51) Int. Cl.
C08F 118/02 (2006.01)
C08L 31/02 (2006.01)
C09J 167/06 (2006.01)
(52) U.S. Cl. .................. 524/556; 525/223; 525/219; 526/319; 526/329.3
(58) Field of Classification Search ................ 524/556; 525/223, 219; 526/319, 329.3
See application file for complete search history.

(56) References Cited

U.S. PATENT DOCUMENTS

2005/0256256 A1* 11/2005 Muramoto et al. .......... 524/556

FOREIGN PATENT DOCUMENTS

| JP | 10-172606 | | 6/1998 |
| JP | 11-240998 | | 9/1999 |
| JP | 11240998 A | * | 9/1999 |
| JP | 2001-181352 | | 7/2001 |
| JP | 2002-216845 | | 8/2002 |

(Continued)

OTHER PUBLICATIONS

I. Khan et al. "ABA Triblock comb copolymers with oligo(oxyethylene) side chains as matrix for ion transport", Makromol. Chem. 190, 1069-1078 (1989).*

(Continued)

Primary Examiner—David Wu
Assistant Examiner—Michael M Bernshteyn
(74) Attorney, Agent, or Firm—Kenyon & Kenyon LLP

(57) ABSTRACT

A polymer including a block chain A which is formed from a random copolymer containing a repeating unit (I) represented by the formula (I)

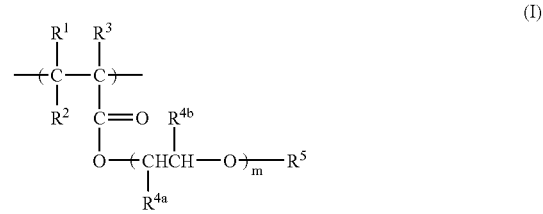

wherein $R^1$ to $R^3$ each independently represents hydrogen or $C_{1-10}$ hydrocarbon and $R^1$ and $R^3$ may bond to form a ring; $R^{4a}$ and $R^{4b}$ each independently represents hydrogen or methyl; $R^5$ represents hydrogen, hydrocarbon, acyl, or silyl; and m represents any integer of 1 to 100 and when m is 2 or more and each $R^{4a}$ may be the same or different from one another and each $R^{4b}$ may be the same or different from one another; and a repeating unit (II) represented by the formula (II)

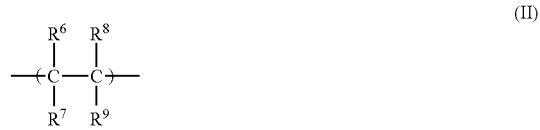

wherein $R^6$ and $R^8$ each independently represents hydrogen or $C_{1-10}$ hydrocarbon and $R^6$ and $R^8$ may bond to form a ring; $R^7$ represents hydrogen, $C_{1-10}$ hydrocarbon, hydroxyl, hydrocarbonoxy, carboxyl, acid anhydride, amino, ester, or an organic group having at least one functional group selected from the group consisting of hydroxyl, carboxyl, epoxy, acid anhydride, and amino; and $R^9$ represents an organic group having at least one functional group selected from the group consisting of hydroxyl, carboxyl, epoxy, acid anhydride, and amino; and a block chain B having a repeating unit (III) represented by the formula (III)

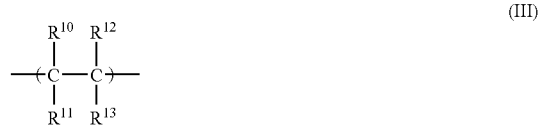

wherein $R^{10}$ to $R^{12}$ each independently represents hydrogen or $C_{1-10}$ hydrocarbon and $R^{13}$ represents aryl or heteroaryl; and wherein an arrangement order thereof is B, A, B.

15 Claims, No Drawings

FOREIGN PATENT DOCUMENTS

| | | |
|---|---|---|
| JP | 2004-047439 | 2/2004 |
| JP | 2004-107641 | 4/2004 |
| JP | 2004-213940 | 7/2004 |
| JP | 2005-089510 | 4/2005 |

OTHER PUBLICATIONS

Japanese Patent Office, International Search Report, Mar. 28, 2006, from related International Patent Application No. PCT/JP2006/300599, filed Jan. 18, 2006.

Handbook of Radical Polymerization, NTS Inc., Fig. 1. Structures of nitroxyl (1 to 5), monofunctional alkoxyamine (6 to 10), polyfunctional alkoxyamine (11 to 13) and styrene derivatives (14 and 15), 1999, p. 107.

Didier Benoit et al., "Development of a Universal Alkoxyamine for "Living" Free Radical Polymerizations" Journal of American Chemical Society, vol. 121, No. 16, 1999, pp. 3904-3920.

* cited by examiner

POLYMER, CROSSLINKED POLYMER, COMPOSITION FOR SOLID POLYMER ELECTROLYTE, SOLID POLYMER ELECTROLYTE, AND ADHESIVE COMPOSITION

RELATED APPLICATION INFORMATION

This application is a United States National Phase Patent Application of, and claims the benefit of, International Patent Application No. PCT/JP2006/300599 which was filed on Jan. 18, 2006, and which claims priority to Japanese Patent Application No. 2005-014195, filed Jan. 21, 2005, the disclosures of each of which are hereby incorporated by reference.

TECHNICAL FIELD

The present invention relates to polymers and crosslinked polymers which are useful as materials for electrochemical devices such as batteries, capacitors, sensors, condensers, electrochromic (EC) devices, and photoelectric conversion elements, and also as fixing agents or the like. The present invention also relates to compositions for solid polymer electrolytes, solid polymer electrolytes, and adhesive compositions which use the abovementioned polymers.

BACKGROUND ART

As a solid polymer electrolyte which uses a polymer having an acrylic ester derivative, which has a polyalkylene oxide chain at the ester moiety thereof, as the repeating unit, a solid polymer electrolyte, for example, which is formed from a matrix component of a crosslinked polymer (A) and electrolyte salt (B) and is produced by the polymerization reaction of the matrix component (A) and which is characterized by containing at least a urethane (meth)acrylate-based compound (A1) and polymerizable monomer (A2) represented by the following formula (1) is conventionally known (refer to Patent document 1).

(1)

In the formula, $R^{101}$ represents hydrogen or $C_{1-4}$ alkyl; $R^{102}$ represents hydrogen, $C_{1-4}$ alkyl, or $C_{1-4}$ acyl; and k', l', and m' each independently represents an integer of 1 to 20.

In addition, in Patent document 2, multi-branched polymers which are obtained by copolymerizing a monomer mixture containing at least a monomer (A3) represented by the formula (2)

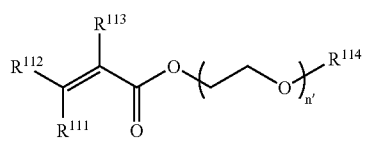

(2)

(in the formula, $R^{111}$ to $R^{113}$ each independently represents hydrogen or $C_{1-4}$ alkyl; $R^{114}$ represents hydrogen, $C_{1-4}$ alkyl, or $C_{1-4}$ acyl; and n' represents an integer of 1 to 20) and monomer (A4) represented by the formula (3)

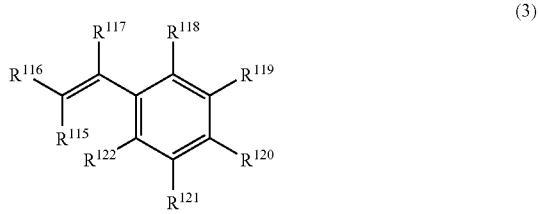

(3)

(in the formula, $R^{115}$ to $R^{117}$ each independently represents hydrogen or $C_{1-4}$ alkyl; and $R^{118}$ to $R^{122}$ each independently represents hydrogen, halogen, $C_{1-4}$ alkyl, or $C_{1-4}$ haloalkyl with a proviso that at least one of $R^{118}$ to $R^{122}$ is $C_{1-4}$ α-haloalkyl), and solid polymer electrolytes which use these multi-branched polymers are described.

Moreover, in Patent document 3, a block copolymer composition characterized by containing a block copolymer formed from a segment (A5) which contains 10 to 100 mol % of at least one polar monomer selected from the group consisting of the following polar monomers 1, 2, and 3 as a constituent, segment (A6) which contains less than 10 mol % of the same polar monomer as a constituent, and ester compound; and a solid polymer electrolyte which uses the composition are described.

Polar monomer 1: a polar monomer having at least one polymerizable unsaturated bond and at least one functional group selected from the group consisting of hydroxyl, nitrile, carboxyl, amino, and amido.

Polar monomer 2: a polar monomer represented by the formula (4)

$$CH_2=CR^{201}-COO-(CH_2-CHR^{202}-O)_t-R^{203} \quad (4)$$

(in the formula, $R^{201}$ to $R^{202}$ each independently represents hydrogen or $C_{1-5}$ alkyl; $R^{203}$ represents $C_{1-5}$ alkyl or phenyl; and t represents an integer of 1 to 25).

Polar monomer 3: a polar monomer represented by the formula (5)

$$CH_2=CR^{204}-COO-(C_fH_{2f}-COO)_g-R^{205} \quad (5)$$

(in the formula, $R^{204}$ represents $C_{1-5}$ alkyl; $R^{205}$ represents $C_{1-10}$ alkyl or phenyl; and f and g each independently represents an integer of 1 to 20).

However, none of the solid polymer electrolytes described in the abovementioned Patent documents had thermal characteristics, physical characteristics, and ionic conductivity which were satisfactory.

On the other hand, as a joining method of cell separators, a method to join by a porous adhesive-resin layer formed from polyfluorovinylidene is described in Patent document 4. In this document, it is disclosed that the adhesive resin used turns into a porous film without being dissolved in an electrolyte and that the ionic conductivity can be adjusted by changing porosity and film thickness.

Additionally, in Patent document 5, a separator for adhesive composition-supporting cells is described as a cell/separator joined body where cells and separators are joined. In this document, a method to make a porous substrate support a heat-crosslinkable adhesive composition formed from polyfunctional isocyanate and reactive polymer is disclosed.

However, with such joining methods using adhesives, it was difficult to maintain adhesive strength when cells are used and the necessity to impart electrolyte properties to the heat-crosslinkable adhesives having no ionic conductivity by introducing a nitrile compound and acrylic-modified fluororesin was a problem.

[Patent document 1] Japanese Laid-Open Patent Application No. 2002-216845
[Patent document 2] Japanese Laid-Open Patent Application No. 2001-181352
[Patent document 3] Japanese Unexamined Patent Application, First Publication No. Hei 11-240998
[Patent document 4] Japanese Unexamined Patent Application, First Publication No. Hei 10-172606
[Patent document 5] Japanese Laid-Open Patent Application No. 2004-47439

DISCLOSURE OF THE INVENTION

Problems to be Solved by the Invention

The present invention is made in view of such circumstances of prior arts and its first object is to provide novel polymers and crosslinked polymers which are useful as production materials for solid polymer electrolytes, adhesive materials or the like.

A second object of the present invention is to provide solid polymer electrolytes which use the polymers and crosslinked polymers of the present invention and which are excellent in thermal characteristics, physical characteristics, and ionic conductivity, and is almost at a practical level; and compositions for solid polymer electrolytes or the like for producing the above electrolytes.

Moreover, a third object of the present invention is to provide adhesive compositions which retain excellent adhesive capacity even in solutions formed from solvents, chemicals, acids/bases, and/or ionic solutions.

Means for Solving the Problem

In order to solve the abovementioned problems, the present invention provides the following polymers (1) to (8).

(1) A polymer characterized by having a block chain A which is formed from a random copolymer containing a repeating unit (I) represented by the following formula (1)

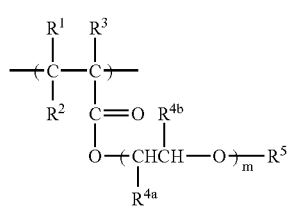

(in the formula, $R^1$ to $R^3$ each independently represents hydrogen or $C_{1-10}$ hydrocarbon and $R^1$ and $R^3$ may bond to form a ring; $R^{4a}$ and $R^{4b}$ each independently represents hydrogen or methyl; $R^5$ represents hydrogen, hydrocarbon, acyl, or silyl; and m represents any integer of 1 to 100 and when m is 2 or more, each $R^{4a}$ may be the same or different from one another and each $R^{4b}$ may be the same or different from one another) and a repeating unit (II) represented by the formula (II)

(in the formula, $R^6$ and $R^8$ each independently represents hydrogen or $C_{1-10}$ hydrocarbon and $R^6$ and $R^8$ may bond to form a ring; $R^7$ represents hydrogen, $C_{1-10}$ hydrocarbon, hydroxyl, hydrocarbonoxy, carboxyl, acid anhydride, amino, ester, or an organic group having at least one functional group selected from the group consisting of hydroxyl, carboxyl, epoxy, acid anhydride, and amino; and $R^9$ represents an organic group having at least one functional group selected from the group consisting of hydroxyl, carboxyl, epoxy, acid anhydride, and amino); and a block chain B having a repeating unit (III) represented by the formula (III)

(in the formula, $R^{10}$ to $R^{12}$ each independently represents hydrogen or $C_{1-10}$ hydrocarbon and $R^{13}$ represents aryl or heteroaryl) in an arrangement order of B, A, B.

(2) The polymer according to (1) in which the block chain A and block chain B are bonded and arranged in the order of B-A-B.

(3) The polymer according to (1) or (2) in which the degree of polymerization of the repeating unit (I) is 5 or more.

(4) The polymer according to any one of (1) to (3) in which the degree of polymerization of the repeating unit (II) is 5 or more.

(5) The polymer according to any one of (1) to (4) in which the block chain A is formed from a random copolymer where the ratio of the number of moles of the repeating unit (I) and repeating unit (II) is within the range of 50 to 95% and 50 to 5%, respectively with respect to the total number of moles of repeating units in the block chain A.

(6) The polymer according to any one of (1) to (5) in which the ratio of the number of moles of the repeating units (I) and (II) summed up together is within the range of 10 to 80% and the ratio of the number of moles of the repeating units (III) is 90 to 20%, respectively with respect to the total number of moles of repeating units in the polymer.

(7) The polymer according to any one of (1) to (6) in which the number average molecular weight of the polymer is within the range of 5000 to 1000000.

(8) The polymer according to any one of (1) to (7) in which the repeating unit (II) is at least one repeating unit selected from the group consisting of repeating unit (IV) represented by the following formula (IV)

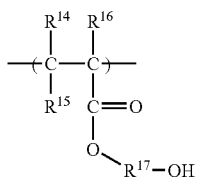

(IV)

(in the formula, $R^{14}$ to $R^{16}$ each independently represents hydrogen or $C_{1-10}$ hydrocarbon and $R^{14}$ and $R^{16}$ may bond to form a ring; $R^{17}$ represents $C_{1-6}$ alkylene, $C_{6-10}$ divalent aromatic hydrocarbon, $C_{3-10}$ divalent alicyclic hydrocarbon, or a divalent organic group in which these groups are combined), repeating unit (V) represented by the following formula (V)

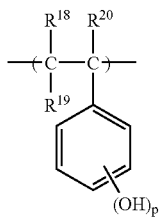

(V)

(in the formula, $R^{18}$ to $R^{20}$ each independently represents hydrogen or $C_{1-10}$ hydrocarbon; and p represents any integer of 1 to 3), repeating unit (VI) represented by the following formula (VI)

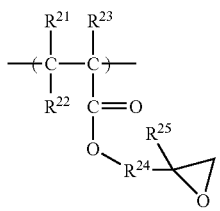

(VI)

(in the formula, $R^{21}$ to $R^{23}$ each independently represents hydrogen or $C_{1-10}$ hydrocarbon and $R^{21}$ and $R^{23}$ may bond to form a ring; $R^{24}$ represents $C_{1-6}$ alkylene, $C_{6-10}$ divalent aromatic hydrocarbon, $C_{3-10}$ divalent alicyclic hydrocarbon, or a divalent organic group in which these groups are combined; and $R^{25}$ represents hydrogen or $C_{1-4}$ alkyl), and repeating unit (VII) represented by the following formula (VII)

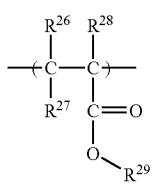

(VII)

(in the formula, $R^{26}$ to $R^{28}$ each independently represents hydrogen or $C_{1-10}$ hydrocarbon and $R^{26}$ and $R^{28}$ may bond to form a ring; $R^{29}$ represents hydrogen or a functional group represented by the following formula (VIII))

$$-R^{30}-CO_2H \quad (VIII)$$

(in the formula, $R^{30}$ represents $C_{1-6}$ alkylene, $C_{6-10}$ divalent aromatic hydrocarbon, $C_{3-10}$ divalent alicyclic hydrocarbon, or a divalent organic group in which these groups are combined).

Secondly, the present invention provides the following crosslinked polymers (9) to (12).

(9) A crosslinked polymer characterized by being obtained by the reaction between the polymer according to any one of (1) to (8) and a crosslinking agent.

(10) The crosslinked polymer according to (9) in which the crosslinking agent is a polyisocyanate compound which has 2 or more isocyanate groups within a molecule or a polyepoxy compound which has 2 or more epoxy groups within the molecule.

(11) The crosslinked polymer according to (9) or (10) characterized by being obtained by reacting the polymer according to any one of (1) to (8) with 0.01 to 2 moles of crosslinking agent with respect to 1 mole of the repeating unit (II) in the polymer.

(12) The crosslinked polymer according to any one of (9) to (11) characterized by being obtained by reacting the polymer according to any one of (1) to (8) with 0.1 to 1 mole of crosslinking agent with respect to 1 mole of the repeating unit (II) in the polymer.

Thirdly, the present invention provides the following compositions (13) to (20) for a solid polymer electrolyte.

(13) A composition for a solid polymer electrolyte characterized by containing the polymer according to any one of (1) to (8) and an electrolyte salt.

(14) The composition for a solid polymer electrolyte according to (13) characterized by further containing a crosslinking agent.

(15) The composition for a solid polymer electrolyte according to (14) in which the crosslinking agent is a polyisocyanate compound which has 2 or more isocyanate groups within a molecule or a polyepoxy compound which has 2 or more epoxy groups within the molecule.

(16) The composition for a solid polymer electrolyte according to (14) or (15) characterized by containing a crosslinking agent within the range of 0.01 to 2 moles with respect to 1 mole of the repeating unit (II) in the polymer.

(17) The composition for a solid polymer electrolyte according to any one of (14) to (16) characterized by containing a crosslinking agent within the range of 0.1 to 1 moles with respect to 1 mole of the repeating unit (II) in the polymer.

(18) The composition for a solid polymer electrolyte according to any one of (13) to (17) in which the block chain A and block chain B are bonded and arranged in the order of B-A-B.

(19) The composition for a solid polymer electrolyte according to any one of (13) to (18) in which the electrolyte salt is at least one selected from the group consisting of alkali metal salts, quaternary ammonium salts, quaternary phosphonium salts, transition metal salts, and protonic acids.

(20) The composition for a solid polymer electrolyte according to any one of (13) to (19) in which the electrolyte salt is a lithium salt.

Fourthly, the present invention provides the following solid polymer electrolytes (21) to (23).

(21) A solid polymer electrolyte characterized by containing the polymer according to any one of (1) to (8) or the crosslinked polymer according to any one of (9) to (12), and an electrolyte salt.

(22) The solid polymer electrolyte according to (21) in which the electrolyte salt is at least one selected from the group consisting of alkali metal salts, quaternary ammonium salts, quaternary phosphonium salts, transition metal salts, and protonic acids.

(23) The solid polymer electrolyte according to (21) or (22) in which the electrolyte salt is a lithium salt.

Fifthly, the present invention provides the following adhesive compositions (24) to (26).

(24) An adhesive composition characterized by containing the polymer according to any one of (1) to (8) and a crosslinking agent.

(25) The adhesive composition according to (24) characterized by being adhesive to olefin-based polymers.

(26) The adhesive composition according to (24) or (25) characterized by having ionic conductivity.

EFFECTS OF THE INVENTION

The polymers of the present invention and crosslinked polymers formed by crosslinking these polymers are novel compounds and useful as materials for producing compositions for solid polymer electrolytes and solid polymer electrolytes.

The solid polymer electrolytes obtained from the compositions for solid polymer electrolytes of the present invention have excellent thermal characteristics, physical characteristics, and ionic conductivity.

In addition, the crosslinked polymers formed by crosslinking the polymers of the present invention have excellent adhesive performance and are useful as materials for fixing agents which bond/fix members such as electrode components.

BEST MODES FOR CARRYING OUT THE INVENTION

The present invention will be described below in detail by dividing into the following items; i.e. 1) polymer, 2) crosslinked polymer, 3) composition for solid polymer electrolyte, 4) solid polymer electrolyte, and 5) adhesive composition.

1) Polymer

The polymers of the present invention are characterized in that they have a block chain A composed from a random copolymer containing a repeating unit (I) represented by the aforementioned formula (I) and repeating unit (II) represented by the aforementioned formula (II); and block chain B which has a repeating unit (III) represented by the aforementioned formula (III) in an arrangement order of B, A, B.

The state described here where each block chain is arranged in the order of B, A, B means that each block chain may be bonded to each other directly or may be bonded having other constituting units such as connecting groups and polymerization chains in between. Above all, the state where each block chain is bonded and arranged in the order of B-A-B is preferable. In this case, the expression "bonded" refers to either the case where each block chain is bonded to each other directly or the case where each block chain is bonded via a low-molecule connecting group such as oxygen and alkylene. In addition, each block chain B may be the same or different.

In the aforementioned formula (I), $R^1$ to $R^3$ each independently represents hydrogen or $C_{1-10}$ hydrocarbon such as methyl, ethyl, n-propyl, isopropyl, n-butyl, sec-butyl, isobutyl, t-butyl, phenyl, naphthyl, and benzyl. In addition, $R^1$ and $R^3$ may bond to form a ring. $R^{4a}$ and $R^{4b}$ each independently represents hydrogen or methyl.

R5 represents hydrogen; hydrocarbon such as methyl, ethyl, n-propyl, isopropyl, n-butyl, sec-butyl, isobutyl, t-butyl, n-hexyl, phenyl, substituted phenyl, and naphthyl; acyl such as formyl, acetyl, propionyl, and butyryl; or silyl such as trimethylsilyl, t-butyldimethylsilyl, and dimethylphenylsilyl.

Additionally, hydrocarbon of the aforementioned $R^1$ to $R^5$ may have a substituent on an appropriate carbon. Specific examples of such substituents include halogen such as fluorine, chlorine, and bromine; hydrocarbon such as methyl, ethyl, n-propyl, phenyl, naphthyl, and benzyl; acyl such as acetyl and benzoyl; cyano; nitro; hydrocarbonoxy such as methoxy and phenoxy; alkylthio such as methylthio; alkylsulfinyl such as methylsulfinyl; alkylsulfonyl such as methylsulfonyl; optionally substituted amino such as amino and dimethylamino; and anilino.

m represents any integer from 1 to 100 and is preferably any integer from 2 to 50. In addition, the value of m in each repeating unit may be the same or different from each other.

When m is 2 or more, each $R^{4a}$ may be the same or different from one another and each $R^{4b}$ may be the same or different from one another.

In addition, the degree of polymerization of the aforementioned repeating unit (I) is preferably 5 or more, although this depends on the value of m, and is more preferably 10 or more.

Specific examples of the aforementioned repeating unit (I) include the following. Note that the examples are given here as monomers which are considered to be formed into the repeating unit (I) represented by the formula (I).

2-Methoxyethyl(meth)acrylate, 2-ethoxyethyl(meth)acrylate, 2-methoxypropyl(meth)acrylate, 2-ethoxypropyl(meth)acrylate, methoxypolyethyleneglycol(meth)acrylate (the number of units of ethyleneglycol is 2 to 100), ethoxypolyethyleneglycol(meth)acrylate, phenoxypolyethyleneglycol(meth)acrylate, methoxypolypropyleneglycol (meth)acrylate (the number of units of propyleneglycol is 2 to 100) ethoxypolypropyleneglycol(meth)acrylate, phenoxypolypropyleneglycol(meth)acrylate, polyethyleneglycolmono(meth)acrylate, 2-hydroxypropyl(meth)acrylate, polypropyleneglycolmono(meth)acrylate, polyethyleneglycol-polypropyleneglycolmono(meth)acrylate, octoxypolyethyleneglycol-polypropyleneglycolmono(meth)acrylate, lauroxypolyethyleneglycolmono(meth)acrylate, stearoxypolyethyleneglycolmono(meth)acrylate, "Blenmer PME series" [which correspond to monomers where $R^1=R^2$=hydrogen, $R^3$=methyl, and m=2 to 90 in the formula (I)] (manufactured by NOF Corporation), acetyloxypolyethyleneglycol(meth)acrylate, benzoyloxypolyethyleneglycol(meth)acrylate, trimethylsilyloxypolyethyleneglycol(meth)acrylate, t-butyldimethylsilyloxypolyethyleneglycol(meth)acrylate, methoxypolyethyleneglycolcyclohexene-1-carboxylate, and methoxypolyethyleneglycolcinnamate.

These compounds can be used alone or in combination of two or more kinds thereof.

In the aforementioned formula (II), $R^6$ and $R^8$ each independently represents hydrogen; or $C_{1-10}$ hydrocarbon such as methyl, ethyl, n-propyl, isopropyl, n-butyl, sec-butyl, isobutyl, t-butyl, phenyl, naphthyl, and benzyl.

$R^6$ and $R^8$ may bond to form a ring.

$R^7$ represents hydrogen; $C_{1-10}$ hydrocarbon; hydroxyl; hydrocarbonoxy such as methoxy, ethoxy, and phenoxy; carboxyl; acid anhydride; amino; ester; or an organic group having at least one functional group selected from the group consisting of hydroxyl, carboxyl, epoxy, acid anhydride, and amino.

$R^9$ represents an organic group having at least one functional group selected from the group consisting of hydroxyl, carboxyl, epoxy, acid anhydride, and amino.

Additionally, $R^6$ to $R^9$ may have a substituent on an appropriate carbon. Specific examples of such substituents include halogen such as fluorine, chlorine, and bromine; hydrocarbon such as methyl, ethyl, n-propyl, phenyl, naphthyl, and benzyl; acyl such as acetyl and benzoyl; cyano; nitro; hydrocarbonoxy such as methoxy and phenoxy; alkylthio such as methylthio; alkylsulfinyl such as methylsulfinyl; alkylsulfonyl such as methylsulfonyl; optionally substituted amino such as amino and dimethylamino; and anilino.

In the present invention, among the repeating units (II) represented by the formula (II), the repeating unit which is represented by the following formula (IV), (V), (VI), or (VII) is preferable.

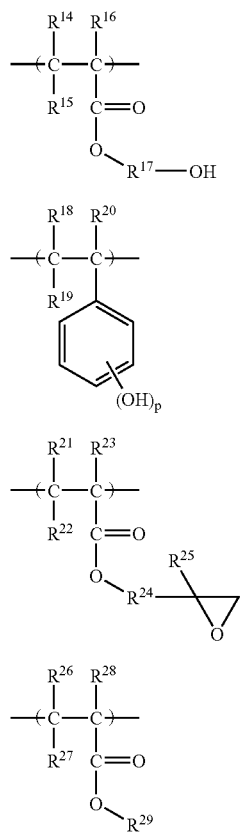

In the aforementioned formula (IV), $R^{14}$ to $R^{16}$ each independently represents hydrogen; or $C_{1-10}$ hydrocarbon such as methyl, ethyl, n-propyl, isopropyl, n-butyl, sec-butyl, isobutyl, t-butyl, phenyl, naphthyl, and benzyl. In addition, $R^{14}$ and $R^{16}$ may bond to form a ring.

$R^{17}$ represents $C_{1-6}$ alkylene such as methylene, ethylene, 1-methylethylene, and propylene; $C_{6-10}$ divalent aromatic hydrocarbon such as phenylene and naphthylene; $C_{3-10}$ divalent alicyclic hydrocarbon such as cyclopropylene, cyclobutylene, cyclohexylene, and adamantanediyl; or a divalent organic group in which two or more of alkylene, divalent aromatic hydrocarbon, and divalent alicyclic hydrocarbon are combined.

Additionally, $R^{14}$ to $R^{17}$ may have a substituent on an appropriate carbon. Specific examples of such substituents include halogen such as fluorine, chlorine, and bromine; hydrocarbon such as methyl, ethyl, n-propyl, phenyl, naphthyl, and benzyl; acyl such as acetyl and benzoyl; nitrile; nitro; hydrocarbonoxy such as methoxy and phenoxy; methylthio; methylsulfinyl; methylsulfonyl; optionally substituted amino such as amino and dimethylamino; and anilino.

Some specific examples of the repeating unit (IV) represented by the formula (IV) are shown below. Note that the examples are given here as monomers which are considered to be formed into the repeating unit (IV). These compounds can be used alone or in combination of two or more kinds thereof.

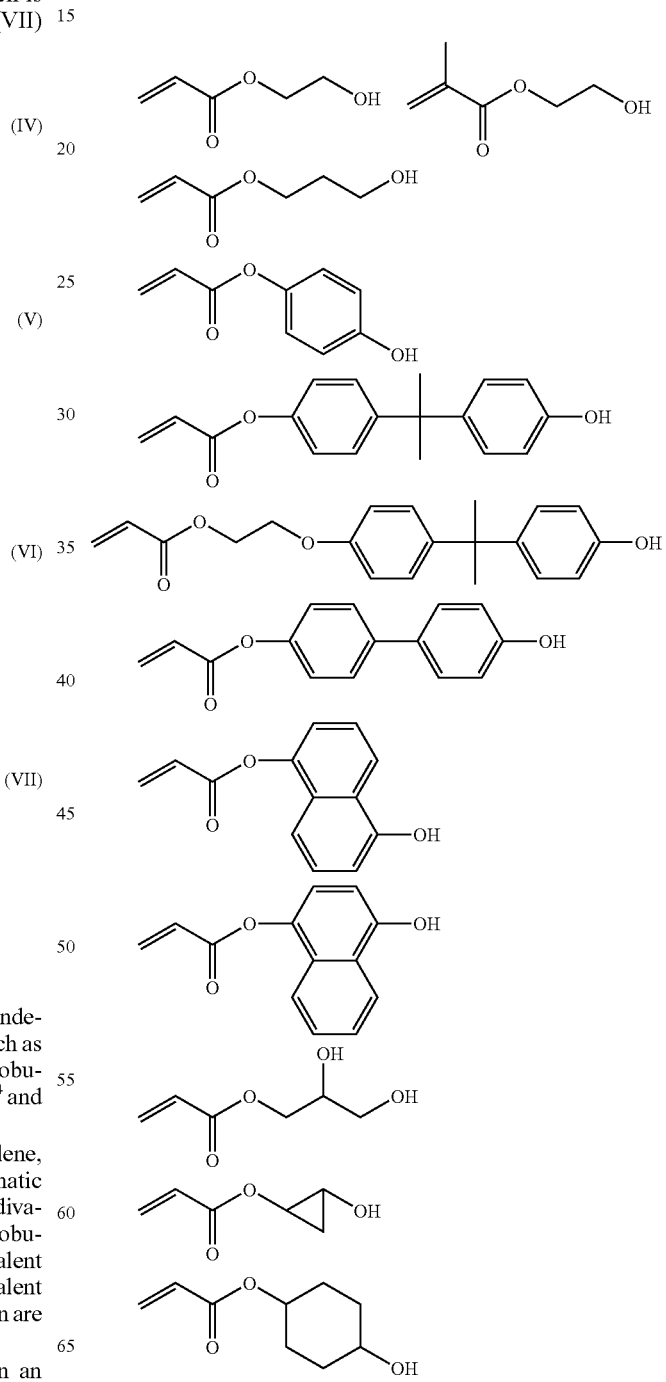

-continued

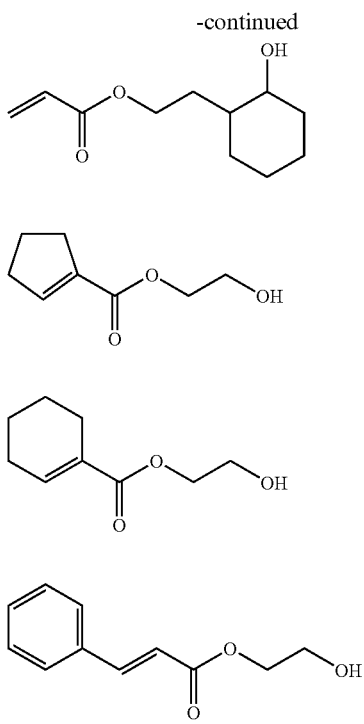

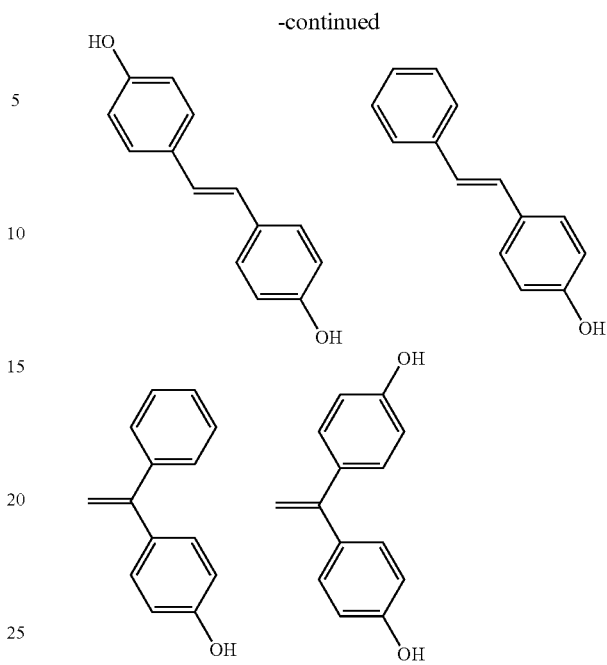

In the aforementioned formula (V), $R^{18}$ to $R^{20}$ each independently represents hydrogen; or $C_{1-10}$ hydrocarbon such as methyl, ethyl, n-propyl, isopropyl, n-butyl, sec-butyl, isobutyl, t-butyl, phenyl, naphthyl, and benzyl; and p represents any integer from 1 to 3. The substituted position of hydroxyl is not particularly limited.

Additionally, $R^{18}$ to $R^{20}$ and phenyl may have a substituent on an appropriate carbon. Examples of such substituents include the same substituents as those shown as the examples of substituents of $R^{14}$ to $R^{17}$.

Some specific examples of the repeating unit (V) represented by the formula (V) are shown below. Note that the examples are given here as monomers which are considered to be formed into the repeating unit (V). These compounds can be used alone or in combination of two or more kinds thereof.

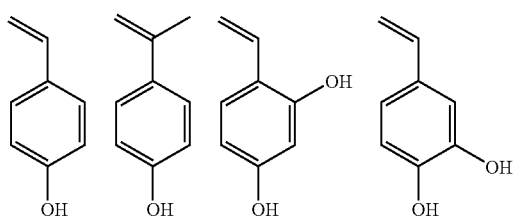

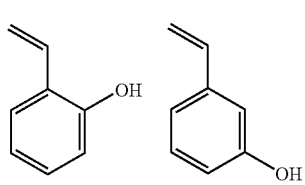

In the aforementioned formula (VI), $R^{21}$ to $R^{23}$ each independently represents hydrogen; or $C_{1-10}$ hydrocarbon such as methyl, ethyl, n-propyl, isopropyl, n-butyl, sec-butyl, isobutyl, t-butyl, phenyl, naphthyl, and benzyl. In addition, $R^{21}$ and $R^{23}$ may bond to form a ring.

$R^{24}$ represents $C_{1-6}$ alkylene such as methylene, ethylene, 1-methylethylene, and propylene; $C_{6-10}$ divalent aromatic hydrocarbon such as phenylene and naphthylene; $C_{3-10}$ divalent alicyclic hydrocarbon such as cyclopropylene, cyclobutylene, cyclohexylene and adamantanediyl; or a divalent organic group in which two or more of alkylene, divalent aromatic hydrocarbon, and divalent alicyclic hydrocarbon are combined.

$R^{25}$ represents hydrogen; or $C_{1-4}$ alkyl such as methyl, ethyl, n-propyl, isopropyl, n-butyl, sec-butyl; isobutyl; and t-butyl.

$R^{21}$ to $R^{25}$ may have a substituent on an appropriate carbon and examples of such substituents include the same substituents as those shown as the examples of substituents of $R^{14}$ to $R^{17}$.

Some specific examples of the repeating unit (VI) represented by the formula (VI) are shown below. Note that the examples are given here as monomers which are considered to be formed into the repeating unit (VI). These compounds can be used alone or in combination of two or more kinds thereof.

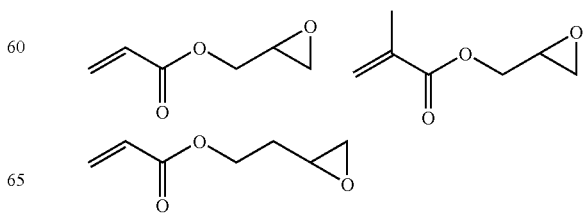

-continued

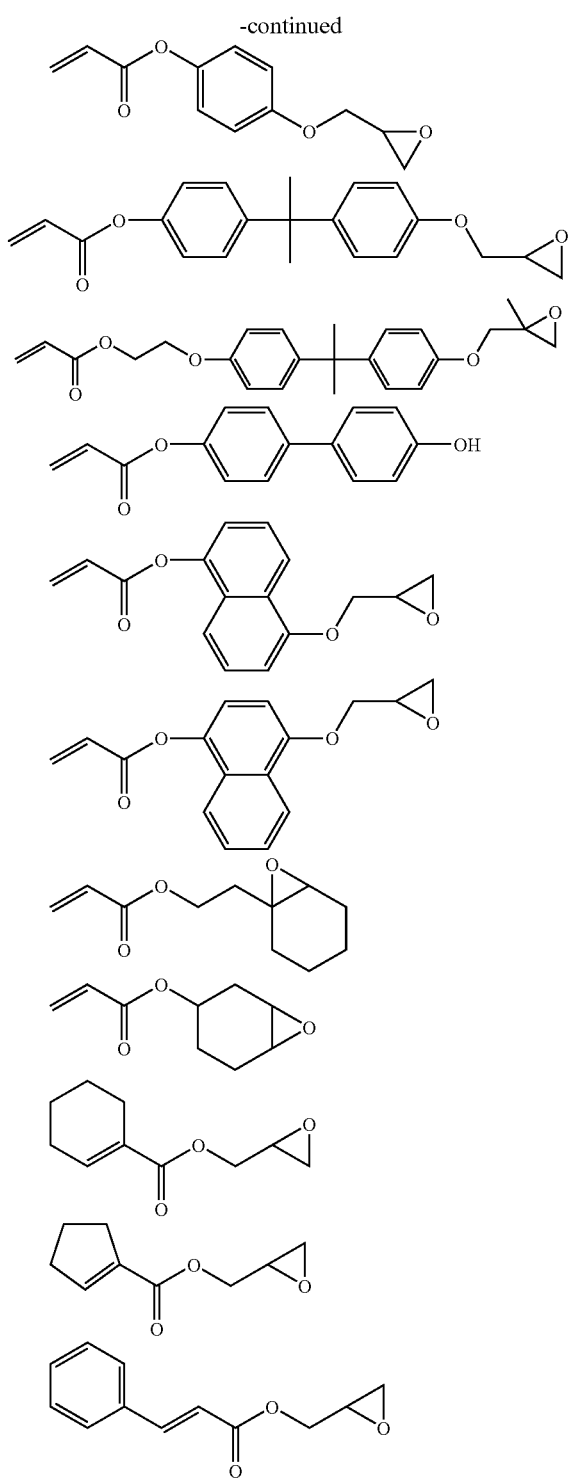

In the aforementioned formula (VII), $R^{26}$ to $R^{28}$ each independently represents hydrogen; or $C_{1-10}$ hydrocarbon such as methyl, ethyl, n-propyl, isopropyl, n-butyl, sec-butyl, isobutyl, t-butyl, phenyl, naphthyl, and benzyl.

In addition, $R^{26}$ and $R^{28}$ may bond to form a ring.

$R^{29}$ represents hydrogen or a functional group represented by the following formula (VIII).

$$-R^{30}-CO_2H \quad (VIII)$$

In the formula (VIII), $R^{30}$ represents $C_{1-6}$ alkylene such as methylene, ethylene, 1-methylethylene, and propylene; $C_{6-10}$ divalent aromatic hydrocarbon such as phenylene and naphthylene; $C_{3-10}$ divalent alicyclic hydrocarbon such as cyclopropylene, cyclobutylene, cyclohexylene and adamantanediyl; or a divalent organic group in which two or more of alkylene, divalent aromatic hydrocarbon, and divalent alicyclic hydrocarbon are combined.

In addition, $R^{26}$ to $R^{30}$ may have a substituent on an appropriate carbon. Examples of such substituents include the same substituents as those shown as the examples of substituents of $R^{14}$ to $R^{17}$.

Some specific examples of the repeating unit (VII) represented by the formula (VII) are shown below. Note that the examples are given here as monomers which are considered to be formed into the repeating unit (VII). These compounds can be used alone or in combination of two or more kinds thereof.

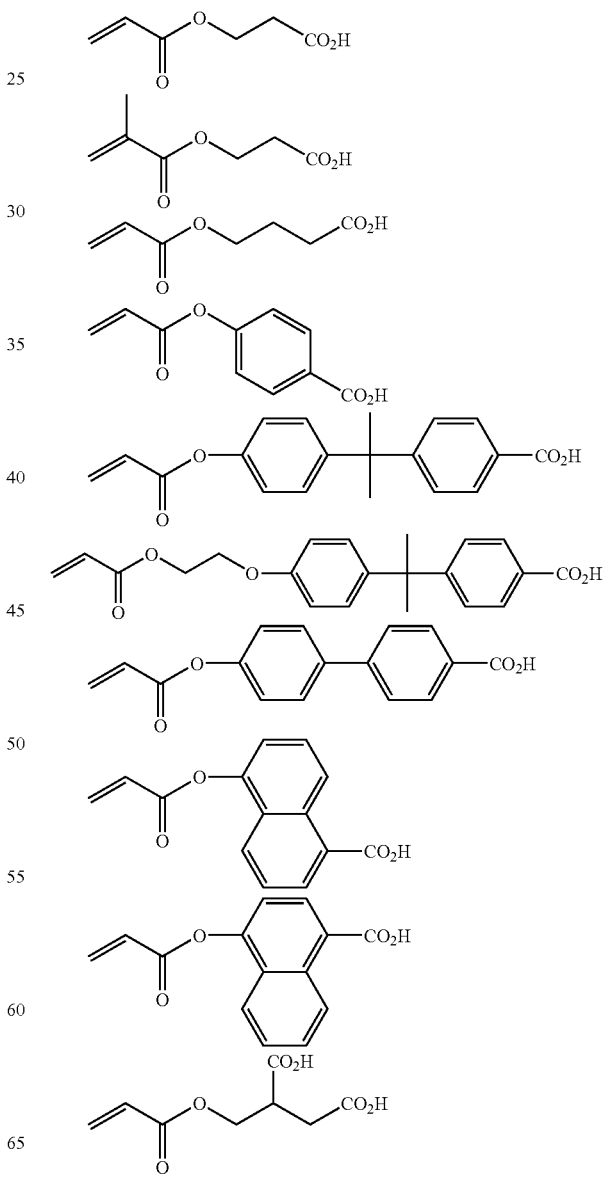

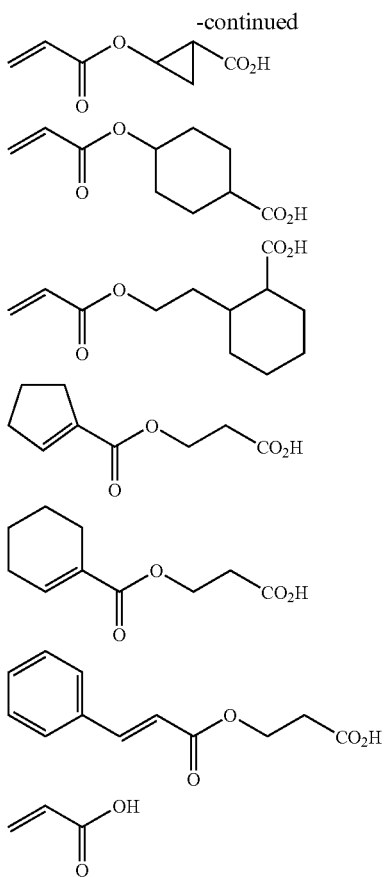

The polymers of the present invention may have the following as the repeating unit (II) apart from the repeating units (IV) to (VII). Note that the examples are given here as monomers which are considered to be formed into the aforementioned repeating unit (II). These compounds can be used alone or in combination of two or more kinds thereof.

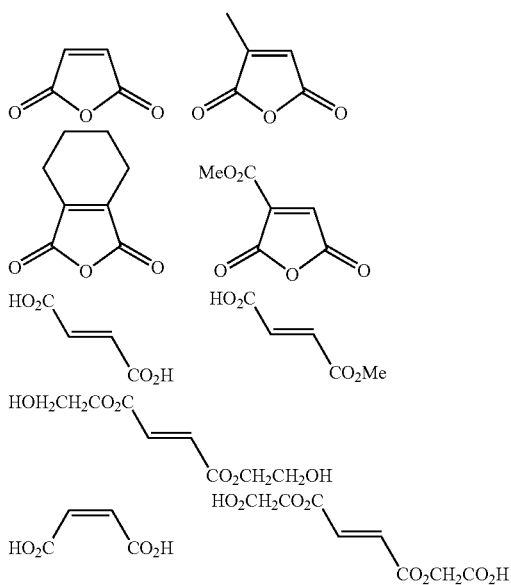

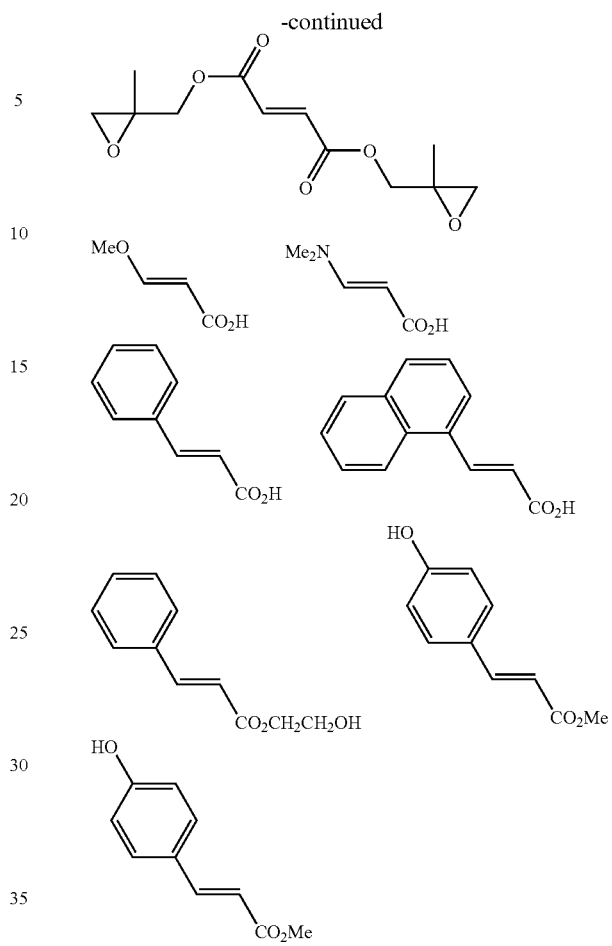

In addition, although the degree of polymerization of the aforementioned repeating unit (II) is not particularly limited, it is preferably 5 or more.

The block chain A of the polymer of the present invention is preferably composed from a random copolymer where the ratio of the number of moles of the repeating unit (I) and repeating unit (II) is within the range from 50 to 95% and 50 to 5%, respectively with respect to the total number of moles of the repeating units in the block chain A. The polymers having such a block chain A are favorable as materials for producing solid polymer electrolytes which have excellent thermal characteristics, physical characteristics, and ionic conductivity.

In the aforementioned formula (III), $R^{10}$ to $R^{12}$ each independently represents hydrogen; or $C_{1-10}$ hydrocarbon such as methyl, ethyl, n-propyl, isopropyl, n-butyl, sec-butyl, isobutyl, t-butyl, phenyl, naphthyl, and benzyl.

$R^{13}$ represents aryl such as phenyl, naphthyl, and anthracenyl; or heteroaryl such as 2-pyridyl and 4-pyridyl.

In addition, $R^{10}$ to $R^{13}$ may have a substituent on an appropriate carbon. Examples of such substituents include the same substituents as those shown as the examples of substituents of $R^{14}$ to $R^{17}$.

Some specific examples of the repeating unit (III) represented by the formula (III) are shown below. Note that the examples are given here as monomers which are considered to be formed into the repeating unit (III). These compounds can be used alone or in combination of two or more kinds thereof.

The examples include styrene, o-methylstyrene, p-methylstyrene, p-t-butylstyrene, α-methylstyrene, p-t-butoxystyrene, m-t-butoxystyrene, 2,4-dimethylstyrene, m-chlorostyrene, p-chlorostyrene, 1-vinylnaphthalene, 9-vinylanthracene, 2-vinylpyridine, and 4-vinylpyridine.

Although the degree of polymerization of the aforementioned repeating unit (III) is not particularly limited, it is preferably 5 or more to form a microphase-separated structure.

In the polymers of the present invention, the ratio of the number of moles of the repeating units (I) and (II) summed up together is within the range of 10 to 80% and the ratio of the number of moles of the repeating units (III) is 90 to 20%, respectively with respect to the total number of moles of the repeating units in the polymer. Such polymers are favorable as materials for producing solid polymer electrolytes which have excellent thermal characteristics, physical characteristics, and ionic conductivity.

The polymers of the present invention can contain different repeating units as constituting units in addition to the aforementioned repeating units (I), (II), and (III) within the molecule thereof.

Examples of such repeating units include the following compounds. Note that the examples are given here as monomers which are considered to be formed into repeating units. These compounds can be used alone or in combination of two or more kinds thereof.

Examples include (meth)acrylic esters such as methyl (meth)acrylate, ethyl(meth)acrylate, n-butyl(meth)acrylate, t-butyl(meth)acrylate, cyclohexyl(meth)acrylate, benzyl (meth)acrylate, isobornyl(meth)acrylate, dicyclopentenyl (meth)acrylate, 1-adamantyl(meth)acrylate, 2-methyl-2-adamantyl(meth)acrylate, 1-methylene adamantyl(meth) acrylate, 1-ethylene adamantyl(meth)acrylate, 3,7-dimethyl-1-adamantyl(meth)acrylate, tricyclodecanyl(meth)acrylate, norbornane(meth)acrylate, mentyl(meth)acrylate, n-propyl (meth)acrylate, isopropyl(meth)acrylate, 2-ethylhexyl(meth) acrylate, isodecyl(meth)acrylate, isooctyl(meth)acrylate, lauryl(meth)acrylate, cyclohexyl(meth)acrylate, tetrahydrofuranyl(meth)acrylate, tetrahydropyranyl(meth)acrylate, 3-oxocyclohexyl(meth)acrylate, butyrolactone(meth)acrylate, and mevaloniclactone(meth)acrylate; conjugated dienes such as 1,3-butadiene, isoprene, 2,3-dimethyl-1,3-butadiene, 1,3-pentadiene, 2-methyl-1,3-pentadiene, 1,3-hexadiene, 1,6-hexadiene, 4,5-diethyl-1,3-octadiene, 3-butyl-1,3-octadiene, and chloroprene; α,β-unsaturated carboximides such as N-methylmaleimide and N-phenylmaleimide; and α,β-unsaturated nitriles such as (meta)acrylonitrile.

Although the number average molecular weight of the polymers of the present invention is not particularly limited, the range between 5000 and 1000000 is preferable. When the number average molecular weight is higher than 5000, thermal and physical characteristics of the polymers improve and when the number average molecular weight is lower than 1000000, moldability or film-formability of the polymers improves.

In addition, although the ratio between the weight average molecular weight (Mw) and number average molecular weight (Mn) of the polymers of the present invention (Mw/Mn) is not particularly limited, the range between 1.01 and 2.50 is preferable and the range between 1.01 and 1.50 is more preferable in order to form a microphase-separated structure which will be described later.

The polymers of the present invention can be produced by known polymerization methods. Specific examples of polymerization methods include a living radical polymerization method in which at least one of the compounds represented by the following formulae (IX), (X), and (XI) is used as a monomer, a transition metal is used as a polymerization catalyst, and an organic halogen compound containing one or more halogen atoms is used as a polymerization initiator; a living radical polymerization method using a stable radical; and a living anionic polymerization method. Living radical polymerization methods are preferable since the targeted polymers can be obtained efficiently.

(IX)

(X)

(XI)

$R^1$ to $R^{13}$ in the formulae (IX) to (XI) are the same as defined above.

Examples of the production methods of the polymers of the present invention include, in further detail, (a) a production method in which block chains are sequentially extended by reacting a macroinitiator, which contains block chains such as a bifunctional block chain obtained by reacting the compound represented by the formulae (IX) or (X) using a bifunctional initiator in a living radical polymerization method, with monomers constituting other block chains;

(b) a production method in which block chains are sequentially extended from an end in the same manner as in the method (a) except that the compound represented by the formulae (IX) or (X) is reacted using a monofunctional initiator; and (c) a production method using a coupling reaction after each block chain or a part of each block chain is polymerized in a predetermined sequence.

Preferable examples of the central metals which constitute the aforementioned transition metal complexes include the elements which belong to $7^{th}$ to $11^{th}$ groups of the periodic table such as manganese, rhenium, iron, ruthenium, rhodium, nickel, and copper (according to Chemical Handbook Fundamental Volume I (4th ed.), edited by The Chemical Society of Japan). Above all, ruthenium is preferable.

Although the ligands which coordinate to these metals to form the complexes are not particularly limited, examples thereof include $C_{18-54}$ triarylphosphine such as triphenylphosphine and trinaphthylphosphine; $C_{3-18}$ trialkylphosphine such as triethylphosphine and tributylphosphine; triarylphosphite such as triphenylphosphite; diphenylphosphinoethane; halogen such as iodine, bromine, and chlorine; carbon monoxide; hydrogen; diene compounds such as cyclopentadiene, cyclohexadiene, cyclooctadiene, cyclooctatetraene, indene, and norbornadiene; aromatic hydrocarbon such as benzene, cymene, phenol, 4-isopropyltoluene, cyclopentadienyltoluene, and indenyltoluene; salicylidene; alkene such as 2-methylpentene and 2-butene; allene; furan; carboxylic acid; nitrogen-containing ligands; and chalcogenide.

Preferable and specific examples of the aforementioned transition metal complexes include dicarbonylcyclopentadienyl iron (I) iodide, dicarbonylcyclopentadienyl ruthenium (II) iodide, and carbonylcyclopentadienyl nickel (II) iodide. These transition metal complexes can be used alone or in combination of two or more kinds thereof.

Organic halogen compounds contain 1 to 4 or even more of halogen (such as fluorine, chlorine, bromine, and iodine) and are used as an initiator which initiates polymerization by interacting with a transition metal complex to generate radical species. Such organic compounds can be used alone or in combination of two or more kinds thereof.

Preferable and specific examples of organic halogen compounds include halogenated hydrocarbons, halogenated esters (halogen-containing esters), halogenated ketones (halogen-containing ketones), and sulfonyl halides (halogenated sulfonyl compounds).

Furthermore, in the living radical polymerization method, an activator which promotes radical polymerization by acting on a metal complex can be used concomitantly. Examples of such activators include Lewis acids and/or amines. The aforementioned Lewis acids and amines can be used alone or in combination of two or more kinds thereof.

The kinds of Lewis acids used are not particularly limited and, for example, aluminum-based Lewis acids, scandium-based Lewis acids, titanium-based Lewis acids, zirconium-based Lewis acids, tin-based Lewis acids, or the like can be used.

Although amines are not particularly limited as long as they are nitrogen-containing compounds such as secondary amines, tertiary amines, and nitrogen-containing aromatic heterocyclic compounds, secondary and tertiary amines are preferable. In addition, compounds which have at least two or more moieties selected from a primary amine moiety, secondary amine moiety, and tertiary amine moiety, within an identical molecule can also be used.

The proportion of a transition metal complex and Lewis acids and/or amines used in terms of mole ratio (i.e. transition metal complex/Lewis acid/amine) is usually approximately 0.05 to 0.2/1 to 10/1 and preferably approximately 0.1/1 to 5/1.

Living radical polymerization can also be carried out using stable radicals.

Examples of stable radical-based initiators include mixtures of a stable free radical compound and radical polymerization initiator, or various alkoxyamines.

Stable free radical compounds are present as free radicals which are stable by themselves at room temperature or under polymerization conditions and also compounds which can produce a redissociable bond by reacting with a growing-end radical during the polymerization reaction. Examples thereof include the compounds which generate one or more of nitroxide radicals and hydrazinyl radicals such as 2,2,6,6-tetramethyl-1-piperidinyloxy (TEMPO), 4-amino-2,2,6,6-tetramethyl-1-piperidinyloxy, 4-hydroxy-2,2,6,6-tetramethyl-1-piperidinyloxy, 4-oxo-2,2,6,6-tetramethyl-1-piperidinyloxy, 4,4'-dimethyl-1,3-oxazoline-3-yloxy, 2,2,5,5-tetramethyl-1-pyrrodinyloxy, di-t-butylnitroxide, and 2,2-di(4-t-octylphenyl)-1-picrylhydrazil.

Radical polymerization initiators are not particularly limited as long as they are compounds which decompose to generate free radicals and examples thereof include organic peroxides such as azo compounds, ketone peroxides, peroxyketals, hydroperoxides, dialkyl peroxides, and peroxyesters. In addition, known polymerization accelerators such as dimethylaniline and cobalt naphthenate which are used by combining with organic peroxides may also be used concomitantly.

These radical polymerization initiators are normally used within the range of 0.05 to 0.5 moles and preferably 0.2 to 2 moles with respect to 1 mole of the aforementioned stable free radical compounds.

Examples of alkoxyamines include the compounds described in documents such as "Handbook of Radical Polymerization" (in Japanese published by NTS Inc., 1999, p107) and J. Am. Chem. Soc., 121, 3904 (1999) and the following compounds are particularly preferable.

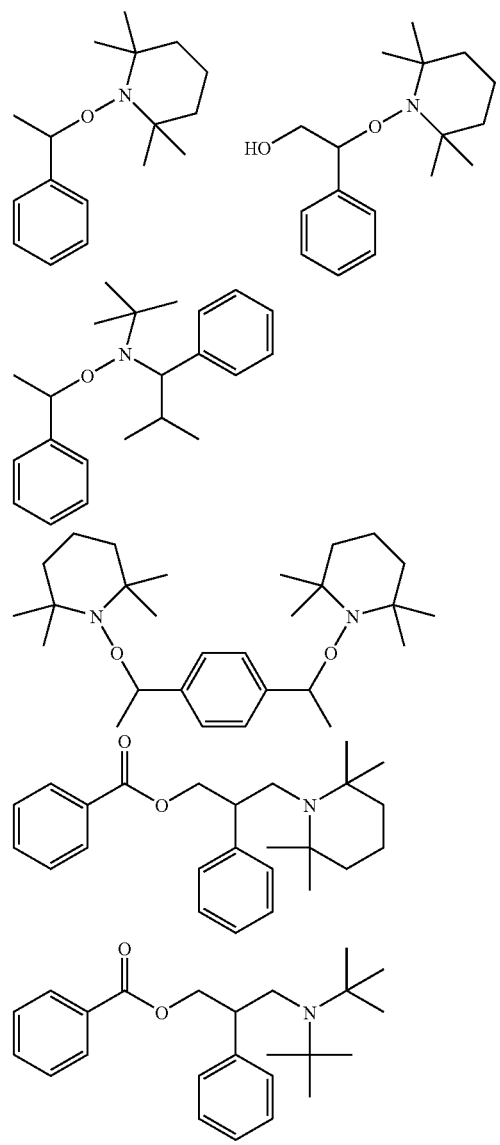

Specific examples of methods for producing a polymer using a living radical polymerization method include the following:

(a) A method in which after a degree of conversion of a first monomer reaches 100%, a second monomer is added to complete the polymerization, and a block copolymer is obtained by repeating this process sequentially adding monomers;
(b) A method in which, even if the degree of conversion of the first monomer does not reach 100%, polymerization is continued by adding the second monomer at the stage where a targeted degree of polymerization or molecular weight is achieved to obtain a gradient copolymer having random parts between block chains; and
(c) A method in which, even if the degree of conversion of the first monomer does not reach 100%, the reaction is once stopped at the stage where a targeted degree of polymerization or molecular weight is achieved. The obtained polymer is taken out of the system and a copolymerization reaction is intermittently proceeded by using the polymer as a macroinitiator and adding other monomers to obtain a block copolymer.

Although polymerization modes are not particularly limited and conventional polymerization modes such as bulk polymerization, solution polymerization, suspension polymerization, or emulsion polymerization can be adopted, solution polymerization is particularly preferable.

In the case where a solution polymerization is carried out, solvents are not particularly limited and conventional solvents including aromatic hydrocarbons (such as benzene, toluene, and xylene), alicyclic hydrocarbons (such as cyclohexane), aliphatic hydrocarbons (such as hexane and octane), ketones (such as acetone, methyl ethyl ketone, and cyclohexanone), ethers (such as tetrahydrofuran and dioxane), esters (such as ethyl acetate and butyl acetate), amides (such as N,N-dimethylformamide and N,N-dimethylacetamide), sulfoxides (such as dimethyl sulfoxide), alcohols (such as methanol and ethanol), and polyhydric alcohol derivatives (such as ethylene glycol monomethyl ether and ethylene glycol monomethyl ether acetate) can be used. These solvents can be used alone or in combination of two or more kinds thereof.

Polymerization reactions can usually be carried out under vacuum conditions or in an atmosphere of inert gases such as nitrogen and argon at a temperature of 0 to 200° C., and preferably at a reaction temperature of 40 to 150° C. under normal or increased pressure.

In addition, when a method which uses a living radical polymerization method and which uses a compound having an active hydrogen such as hydroxyl and carboxyl within the molecule is adopted as the polymerization method for the polymers of the present invention, it is possible to first protect the active hydrogen by known protection reactions such as silylation, acetalization, and butoxycarbonylation where necessary to provide for the polymerization reaction and then carry out a deprotection reaction using an acid, alkaline, or the like after the polymerization.

Tracing of the polymerization reaction and confirmation of the completion of the polymerization reaction can be easily carried out by known analytical means, for example, gas chromatography, liquid chromatography, gel permeation chromatography, membrane osmometry, NMR, or the like.

After the completion of the polymerization reaction, a targeted polymer can be isolated by applying a normal separation/purification method such as column purification, or filtering and drying polymer components which are precipitated when the reaction solution was poured into water or poor solvents.

2) Crosslinked Polymer

The crosslinked polymer of the present invention is characterized by being obtained due to the reaction between the polymer of the present invention and crosslinking agent.

The crosslinking agents used are not particularly limited as long as they react with a reaction point such as a hydroxyl group contained in the aforementioned repeating units (II) to crosslink. Among the crosslinking agents, the polyisocyanate compounds which contain 2 or more isocyanate groups within the molecule or the polyepoxy compounds which contain 2 or more epoxy groups within the molecule are preferable.

Specific examples of the aforementioned polyisocyanate compounds include a polyisocyanate such as tolylene diisocyanate (TDI), diphenylmethane diisocyanate (MDI), hydrated diphenylmethane diisocyanate (H-MDI), triphenylmethane triisocyanate, polyphenylmethane polyisocyanate (crude MDI), modified diphenylmethane diisocyanate (modified MDI), hydrated xylylene diisocyanate (H-XDI), xylylene diisocyanate (XDI), hexamethylene diisocyanate (HMDI), trimethylhexamethylene diisocyante (TMHMDI), tetramethylxylylene diisocyante (m-TMXDI), isophorone diisocyanate (IPDI), norbornene diisocyanate (NBDI), 1,3-bis(isocyanatomethyl) cyclohexane (H6XDI), and 1,5-naphthalene diisocyanate; or a trimer compound of these polyisocyanates, and a reaction product of these polyisocyanates with polyols.

Moreover, blocked isocyanates in which a part of or all of the isocyante groups are blocked using known blocking agents such as phenolic compounds and oximes may be used. In addition, a chain extender such as ethylene glycol, propylene glycol, hexamethylene-1,6-diol, and polyethylene glycol may be used concomitantly where necessary.

When a polyisocyante compound is used, amines such as triethylamine, triethylenediamine, and hexamethylenetetramine; or heavy metal compounds such as cobalt naphthenate, tetra-n-butyltin, and dibutyltin dilaurate may be used concomitantly as curing-promoting agents where necessary.

Additionally, examples of the aforementioned polyepoxy compounds include the compounds which contain 2 or more epoxy groups such as bisphenol-A epoxy resin, bisphenol-F epoxy resin, hydrated bisphenol-A epoxy resin, phenol novolac epoxy resin, cresol novolac epoxy resin, glycidyl ester epoxy resin, polyglycol epoxy resin, alicyclic epoxy resin, glycidyl amine epoxy resin, isocyanurate epoxy resin, and halogenated bisphenol-A epoxy resin.

When a polyepoxy compound is used, tertiary amines such as benzyldimethyl amine and imidazoles such as 2-ethyl imidazole may be used concomitantly as curing-promoting agents where necessary.

Moreover, in the present invention, one which is normally used as a hardener for an epoxy resin can also be used as other crosslinking agents. Examples thereof include aliphatic polyamines such as triethylene diamine and triethylene tetramine; aromatic polyamines such as diaminodiphenyl methane; alicyclic polyamines such as N-aminoethyl piperazine; acid anhydrides such as 4-methylhexahydrophthalic anhydride, trimellitic anhydride, and pyromellitic anhydride; polyphenols such as phenol novolac resin, cresol novolac resin, and poly-p-hydroxystyrene; dicyandiamide and polyamide resin; boron trifluoride-amine complexes; and various onium salts.

In addition, when the aforementioned acid anhydrides or polyphenols are used as a crosslinking agent, known curing-promoting agents, for example, the aforementioned tertiary amines and imidazoles may be used concomitantly where necessary.

Each of these crosslinking agents, curing agents, and curing-promoting agents can be used alone or in combination of two or more kinds thereof. In addition, when an epoxy group is present in the repeating unit (II), an epoxy curing agent can apparently be made to function as a crosslinking agent.

The combination of reactive groups contained in the aforementioned repeating units (II) with the crosslinking agent is not particularly limited as long as they react with each other. For example, when the reactive group in the aforementioned repeating unit (II) is hydroxyl, polyisocyanate compounds can be used as a crosslinking agent, and when the reactive group is carboxyl, amino, or phenolic hydroxyl, polyepoxy compounds can be used as crosslinking agents.

Although the amount of crosslinking agent used is not particularly limited, the range thereof is preferably 0.01 to 2 moles and more preferably 0.1 to 1 moles with respect to 1 mole of the repeating unit (II) having a crosslinking point. When using crosslinking agents within the range of 0.01 to 2 moles, crosslinked polymers having satisfactory thermal properties and physical properties, and also satisfactory ionic conductivity can be obtained.

Crosslinking reactions can be carried out using a method in which a mixture of the polymer of the present invention and crosslinking agent is heated or a method in which the aforementioned mixture is irradiated with various energy rays such as ultraviolet rays, infrared rays, far infrared rays, and microwaves.

3) Composition for Solid Polymer Electrolyte

The composition for a solid polymer electrolyte of the present invention is characterized by containing the polymer of the present invention and electrolyte salt. In addition, the composition for a solid polymer electrolyte of the present invention preferably contains a crosslinking agent.

In the composition for a solid polymer electrolyte of the present invention, although the polymer may be used alone or in combination of two or more kinds thereof, it is preferably a copolymer which has at least a microphase-separated structure and more preferably a block copolymer in which the block chain A and block chain B are bound together and arranged in an order of B-A-B.

The composition for a solid polymer electrolyte of the present invention is not particularly limited as long as it contains a polymer, in which a polymer segment (P1) which has an ionic conductivity, polymer segment (P2) which does not have an ionic conductivity, and a polymer segment (P3) which has a crosslinking point are arranged in an order of P2, P1/P3, and P2 (i.e. the polymer of the present invention); a crosslinking agent; and an electrolyte salt.

Specific examples of the polymer segment (P1) having ionic conductivity and a polymer segment (P3) having a crosslinking point include the aforementioned block chain A, and specific examples of the polymer segment (P2) which does not have an ionic conductivity include the aforementioned block chain B. In addition, as the aforementioned polymer which has an arrangement in the order of P2, P1/P3, and P2, those having a microphase-separated structure are preferable.

As specific examples of the crosslinking agent used in the composition for a solid polymer electrolyte of the present invention, polyisocyanate compounds containing 2 or more isocyanate groups within the molecule or the polyepoxy compounds having 2 or more epoxy groups within the molecule are preferable.

Specific examples of these crosslinking agents include the same crosslinking agents as those described above.

In addition, the amount of crosslinking agent mixed therein is preferably within the range of 0.01 to 2 moles and more preferably 0.1 to 1 mole with respect to 1 mole of the aforementioned repeating unit (II) of the polymer.

The electrolytic salts used in the composition for solid polymer electrolytes of the present invention are not particularly limited, and electrolytes which contain ions suitable as a carrier depending on the electric charge may be used. Among them, it is preferable to use those in which the dissociation constant in a solid polymer electrolyte obtained by hardening is large. The electrolyte salt may be used alone or in combination of two or more kinds thereof.

Examples of the electrolyte salts used in the present invention include alkali metal salts, quaternary ammonium salts such as $(CH_3)_4NBF_6$, quaternary phosphonium salts such as $(CH_3)_4PBF_6$, transition metal salts such as $AgClO_4$, and protonic acids such as hydrochloric acid, perchloric acid, and hydrofluoroboric acid. Among them, alkali metal salts, quaternary ammonium salts, and quaternary phosphonium salts are preferable and alkali metal salts are particularly preferable.

Specific examples of alkali metal salts include $LiCF_3SO_3$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiB(CF_3SO_2)_2$, $LiPF_6$, $LiClO_4$, $LiI$, $LiBF_4$, $LiSCN$, $LiAsF_6$, $NaCF_3SO_3$, $NaPF_6$, $NaClO_4$, $NaI$, $NaBF_4$, $NaAsF_6$, $KCF_3SO_3$, $KPF_6$, $KI$, $LiCF_3CO_3$, $NaClO_3$, $NaSCN$, $KBF_4$, $Mg(ClO_4)_2$, and $Mg(BF_4)_2$, and lithium salts are particularly preferable.

The amount of electrolyte salt added is within the range of 0.005 to 80 mole % and preferably 0.01 to 50 mole % with respect to the alkylene oxide unit of the aforementioned repeating unit (I).

The composition for a solid polymer electrolyte of the present invention can be produced by adding and mixing (combining) the polymer of the present invention, crosslinking agent, and electrolyte salt.

The methods for adding and mixing (combining) the polymer of the present invention, crosslinking agent, and electrolyte salt are not particularly limited and examples thereof include a method to dissolve the polymer of the present invention, crosslinking agent, and electrolyte salt in an appropriate solvent such as tetrahydrofuran, methyl ethyl ketone, acetonitrile, ethanol, and dimethylformamide; and a method to mechanically mix the polymer of the present invention, crosslinking agent, and electrolyte salt at normal temperature or under heating.

4) Solid Polymer Electrolyte

The solid polymer electrolyte of the present invention is characterized by containing the polymer of the present invention or the crosslinked polymer; and electrolyte salt.

Examples of the methods for producing the solid polymer electrolyte of the present invention include the following: (i) a method in which the aforementioned composition for a solid polymer electrolyte of the present invention is, after being formed into various shapes such as sheet, membrane, and film, crosslinked using the aforementioned various energy forms to produce an ion conductive and sheet/membrane/film-shaped crosslinked polymer; (ii) a method in which the composition formed from the polymer of the present invention and crosslinking agent is crosslinked using various energy forms such as heat until almost complete crosslinking is achieved, and then completely crosslinking and hardening by further adding an electrolyte salt; (iii) a method in which a composition formed from two or more kinds of the polymers of the present invention which have different crosslinking conditions and one or more kinds of crosslinking agents is crosslinked under conditions where only one kind of polymer is crosslinked, and then the other kind(s) of polymer is further crosslinked and hardened by adding an electrolyte salt; and (iv) a method in which a composition formed from two or more kinds of the polymers of the present invention which have different crosslinking conditions, one or more kinds of crosslinking agents, and an electrolyte salt is crosslinked under conditions where only one kind of polymer is crosslinked, and then the other kind(s) of polymer is further crosslinked and hardened. Among these methods, the method (i) is preferable since the degree of freedom in terms of processing is increased resulting in a greater advantage in terms of application.

Examples of the means to produce the solid polymer electrolytes shaped as a sheet or the like include a method in which the aforementioned composition for a solid polymer electrolyte is film-formed on a support using various coating means such as a roll coating method, curtain coating method, spin coating method, dipping method, and casting method, and then a crosslinking reaction is carried out using the aforementioned energy followed by the separation/removal of the support.

The solid polymer electrolytes shaped as a sheet or the like are not particularly limited as long as they are any of the following; i.e. a film which includes a polymer segment (P1) having an ionic conductivity, a polymer segment (P2) which does not have ionic conductivity, and a crosslinked polymer segment (P4), and which includes a network-type microphase-separated structure within the film; or a film which includes the polymer segment (P1) having ionic conductivity, a polymer segment (P2) which does not have ionic conductivity, and a crosslinked polymer obtained by the reaction between a polymer which contains a polymer segment (P3) having a crosslinking point and crosslinking agent, and which includes a network-type microphase-separated structure within the film. However, the polymer having the abovementioned P1, P2, and P3 and which forms a microphase-separated structure is preferable.

Specific examples of the polymer segment (P1) having ionic conductivity and a polymer segment (P3) having a crosslinking point include the aforementioned block chain A, and specific examples of the polymer segment (P2) which does not have ionic conductivity include the aforementioned block chain B.

Since the solid polymer electrolyte of the present invention shaped as a sheet or the like has a structure containing a network-type microphase-separated structure in the film, the film maintains ionic conductivity (conductivity) and also has improved physical properties, thermal properties, and especially film strength.

The solid polymer electrolyte of the present invention can favorably be used in solid polymer electrolyte batteries.

The solid polymer electrolyte batteries can be produced, for example, by methods such as a method in which the solid polymer electrolyte of the present invention is used by forming into a compact such as films in advance and is incorporated between electrodes; or a method in which the composition containing a polymer such as the aforementioned copolymer and electrolyte salt is film-formed on electrodes and the aforementioned solid polymer electrolyte is film-formed on the cathode using various coating means such as a roll coating method, curtain coating method, spin coating method, dipping method, and casting method, and then the other electrode is further disposed.

5) Adhesive Composition

The adhesive composition of the present invention is characterized by containing the polymer of the present invention and crosslinking agent.

In the adhesive composition of the present invention, with respect to 1 mole of the repeating unit (II) in the polymer of the present invention, those containing 0.01 to 2 moles of a crosslinking agent are preferable and those containing 0.1 to 1 mole of the crosslinking agent are more preferable.

Examples of the crosslinking agent used include the polyisocyanate compounds which contain 2 or more isocyanate groups within the molecule and the polyepoxy compounds which contain 2 or more epoxy groups within the molecule.

Since the adhesive composition of the present invention has high adhesion to the coating substrates such as plastics including olefin resins, metals, inorganic compounds, and ceramics, and is excellent in the resistance to solvents, it can be used in solvents and is expected to be used as an adhesive between components which is free from deterioration in adhesive force. In addition, since the polymers used in the adhesive composition of the present invention include the repeating unit (I) having a polyalkylene oxy group, they can be used as the adhesive composition having ionic conductivity.

Examples of the methods for using the adhesive composition of the present invention include, (i) a method in which the polymer of the present invention and a crosslinking agent are dissolved in a solvent and the resulting solution is coated onto a substrate to crosslink/harden; (ii) a method in which two or more kinds of the polymers of the present invention which have different crosslinking conditions and one or more kinds of crosslinking agents are dissolved in a solvent and the resulting solution is coated onto a substrate, and after crosslinking under conditions where only one kind of polymer of the present invention is crosslinked, the rest is further crosslinked and hardened; and (iii) a method in which two or more kinds of the polymers of the present invention which have different crosslinking conditions and one or more kinds of crosslinking agents are crosslinked under conditions where only one kind of polymer of the present invention is crosslinked, and then the rest is further crosslinked and hardened.

EXAMPLE

Although the present invention will hereinafter be described in detail using Examples, the present invention is not limited to the Examples.

Example 1

(1) Synthesis of B-A1-B Copolymer

In an argon atmosphere, 30.0 g (60.4 mmol) of methoxypolyethyleneglycol monomethacrylate (Blenmer PME-400 manufactured by NOF Corporation which is a polymer where $R^1=R^2=R^{4a}=R^{4b}$=hydrogen, $R^3=R^5$=methyl, and m=9 in the aforementioned formula (I) and hereinafter is abbreviated as "PME-400"), 3.3 g (25.6 mmol) of 2-hydroxyethylmethacrylate (hereinafter abbreviated as "HEMA"), and 100 g of toluene were added to a flask and after mixing them uniformly, degassing treatment was conducted. 0.16 g (0.17 mmol) of dichlorotris(triphenylphosphine)ruthenium and 0.09 g (0.67 mmol) of di-n-butylamine were added to this mixed solution and by further adding 0.06 g (0.33 mmol) of 2,2-dichloroacetophenone and heating to 80° C. while stirring, a polymerization reaction was initiated.

22 hours after the initiation of the polymerization reaction, the temperature of the reaction system was cooled down to 0° C. to stop the polymerization reaction. A metal complex and unreacted monomers were removed by carrying out the column purification of the reaction solution.

A viscous residue obtained by removing volatile components under reduced pressure was dried under reduced pressure at 60° C. for 5 hours. The polymerization yield with respect to the total amount of monomers used was 68%.

As described so far, a random copolymer of PME-400 and HEMA was obtained. When GPC-MALLS analysis of the obtained copolymer was performed, Mn=129000 and the ratio Mw/Mn=1.37. The polymer obtained as described above will hereinafter be abbreviated as "P-PME/HEMA-1".

Subsequently, in an argon atmosphere, 20.0 g (0.15 mmol) of P-PME/HEMA-1, 8.6 g (82.3 mmol) of styrene (hereinafter abbreviated as "St"), and 115 g of toluene were added to a flask and after mixing them uniformly, degassing treatment was conducted. 0.05 g (0.06 mmol) of chloropentamethylcyclopentadienyl bis(triphenylphosphine)ruthenium (hereinafter abbreviated as "CPS") and 0.04 g (0.3 mmol) of di-n-butylamine were added to this mixed solution and by heating to 100° C., a copolymerization reaction was initiated.

42 hours after the initiation of the copolymerization reaction, the temperature of the reaction system was cooled down to 0° C. to stop the copolymerization reaction. The polymerization yield of styrene was 28%. The viscous residue obtained by reprecipitating with a large amount of n-hexane was dried under reduced pressure at 60° C. for 5 hours.

As described so far, the copolymer in which a block chain B composed from polystyrene (PSt) and block chain A composed from P-PME/HEMA-1 were bonded in the order of B-A1-B was obtained.

The results of $^1$H-NMR analysis on this copolymer showed that the compositional ratio of the polymer was PME-400/HEMA/St=80/9/11 (wt. %) and the PEO (polyethyleneoxide) content was 64%.

The polymer obtained as described above (PSt-b-(P-PME/HEMA-1)-b-PSt) will be abbreviated as "R-1".

(2) Preparation of the Composition for Solid Polymer Electrolyte (I)

In an argon atmosphere, 2 g of (R-1) and 0.15 g of tolylene-2,4-diisocyanate (hereinafter abbreviated as "TDI") as a crosslinking agent were dissolved in 18 g of the mixed solvent of THF and acetonitrile (THF/acetonitrile=8 g/10 g) and by dissolving uniformly by further adding 0.15 g of LiPF$_6$, the composition for a solid polymer electrolyte (1) was prepared.

(3) Preparation and Characteristic Evaluation of Solid Electrolyte Film

The abovementioned composition (1) was flow-casted onto a polytetrafluoroethylene sheet under an argon atmosphere and after being left for 24 hours at room temperature, was dried under reduced pressure at 60° C. for 5 hours and at 100° C. for further 10 hours to obtain a uniform solid electrolyte film (film thickness was 100 μm).

This solid electrolyte film was sandwiched between platinum plates under an argon atmosphere and the ionic conductivity measurements were carried out over a frequency range of 5 to 10 MHz by the complex impedance analysis using a Solartron 1260 impedance analyzer.

The results showed that the ionic conductivity was $9.4 \times 10^{-6}$ S/cm at 20° C., $2.0 \times 10^{-5}$ S/cm at 30° C., $3.9 \times 10^{-5}$ S/cm at 40° C., $6.5 \times 10^{-5}$ S/cm at 50° C., and $9.7 \times 10^{-5}$ S/cm at 60° C.

Example 2

(1) Synthesis of B-A2-B Copolymer

In an argon atmosphere, 30.0 g (60.4 mmol) of methoxypolyethyleneglycol monomethacrylate (Blenmer PME-1000 manufactured by NOF Corporation which is a polymer where $R^1=R^2=R^{4a}=R^{4b}$=hydrogen, $R^3=R^5$=methyl, and m=23 in the aforementioned formula (I) and hereinafter is abbreviated as "PME-1000"), 3.3 g (25.6 mmol) of HEMA, and 100 g of toluene were added to a flask and after mixing them uniformly, degassing treatment was conducted.

0.16 g (0.17 mmol) of dichlorotris(triphenylphosphine)ruthenium and 0.09 g (0.67 mmol) of di-n-butylamine were added to this mixed solution and by further adding 0.06 g (0.33 mmol) of 2,2-dichloroacetophenone and heating to 80° C. while stirring, a polymerization reaction was initiated.

62 hours after the initiation of the polymerization reaction, the temperature of the reaction system was cooled down to 0° C. to stop the polymerization reaction. A metal complex and unreacted monomers were removed by carrying out the column purification of the reaction solution. A viscous residue obtained by removing volatile components under reduced pressure was dried under reduced pressure at 60° C. for 5 hours. The polymerization yield with respect to the total amount of monomers used was 76%.

As described so far, a random copolymer of PME-1000 and HEMA was obtained. When GPC-MALLS analysis of the obtained copolymer was performed, Mn=169000 and the ratio Mw/Mn=1.71. This polymer will be abbreviated as "P-PME/HEMA-2".

Subsequently, in an argon atmosphere, 22.4 g (0.14 mmol) of P-PME/HEMA-2, 14.9 g (143.4 mmol) of St, and 112 g of toluene were added to a flask and after mixing them uniformly, degassing treatment was conducted. 0.05 g (0.06 mmol) of CPS and 0.04 g (0.3 mmol) of di-n-butylamine were added to this mixed solution and by heating to 100° C., a copolymerization reaction was initiated.

68 hours after the initiation of the copolymerization reaction, the temperature of the reaction system was cooled down to 0° C. to stop the copolymerization reaction. The polymerization yield of styrene was 26%. The viscous residue obtained by reprecipitating with a large amount of hexane was dried under reduced pressure at 30° C. for 20 hours.

As described so far, the copolymer in which a block chain B composed from polystyrene (PSt) and block chain A2 composed from P-PME/HEMA-2 were bonded in the order of B-A2-B was obtained.

The results of $^1$H-NMR analysis on the obtained copolymer showed that the compositional ratio of the polymer was PME-1000/HEMA/St=77/8/15 (wt. %) and the PEO (polyethyleneoxide) content was 70%. The copolymer obtained as described above will be abbreviated as "R-2".

(2) Preparation of the Composition for Solid Polymer Electrolyte (2)

In an argon atmosphere, 2 g of (R-2) and 0.25 g of TDI as a crosslinking agent were dissolved in 18 g of the mixed solvent of THF and acetonitrile (THF/acetonitrile=8 g/10 g) and by dissolving uniformly by further adding 0.15 g of LiPF$_6$, the composition for a solid polymer electrolyte (2) was prepared.

(3) Preparation and Characteristic Evaluation of Solid Electrolyte Film

In an argon atmosphere, the abovementioned composition (2) was flow-casted onto a polytetrafluoroethylene sheet and after being left for 24 hours at room temperature, was dried under reduced pressure at 60° C. for 5 hours and at 100° C. for further 10 hours to obtain a uniform solid electrolyte film (film thickness was 100 μm).

This solid electrolyte film was sandwiched between platinum plates under an argon atmosphere and the ionic conductivity measurements were carried out over a frequency range of 5 to 10 MHz by the complex impedance analysis using a Solartron 1260 impedance analyzer.

The results showed that the ionic conductivity was 1.7×$10^{-5}$ S/cm at 20° C., 3.6×$10^{-5}$ S/cm at 30° C., 6.6×$10^{-5}$ S/cm at 40° C., 1.2×$10^{-4}$ S/cm at 50° C., and 1.9×$10^{-4}$ S/cm at 60° C.

Comparative Example 1

(1) Synthesis of B-A3-B Block Copolymer

In an argon atmosphere, 1.44 g (1.5 mmol) of dichlorotris (triphenylphosphine)ruthenium and 630 g (566.0 mmol) of PME-1000 were added to 1143.7 g of toluene, in which an argon degassing treatment was carried out in advance, and after mixing them uniformly, 0.81 g (6.2 mmol) of di-n-butylamine and 0.83 g (4.4 mmol) of 2,2-dichloroacetophenone were added thereto and by heating to 80° C. while stirring, a polymerization reaction was initiated.

22 hours after the initiation of the polymerization reaction, the temperature of the reaction system was cooled down to 0° C. to stop the polymerization reaction. The results of GPC analysis on the reaction solution showed that the polymerization conversion degree of PME-1000 was 50%. Then a metal complex and unreacted monomers were removed by carrying out the column purification of the reaction solution. Volatile components were removed under reduced pressure to obtain polyPME-1000 (hereinafter abbreviated as "P-PME-1"). The GPC analysis on the obtained P-PME-1 showed that it was a monodisperse polymer in which Mn was 115000.

Subsequently, in an argon atmosphere, 0.53 g (0.65 mmol) of CPS, 110.1 g (1.10 mmol) of P-PME-1, 50.1 g (480 mmol) of St, and 0.57 g (5.0 mmol) of n-octane were added to 475.4 g of toluene, in which a degassing treatment was carried out in advance, and after mixing them uniformly, 0.32 g (2.5 mmol) of di-n-butylamine was added thereto and by heating to 100° C. while stirring, a copolymerization reaction was initiated. 45 hours after the initiation of the copolymerization reaction, the temperature of the reaction system was cooled down to 0° C. to stop the copolymerization reaction.

The results of GC analysis showed that the polymerization conversion degree of St was 36%. As described earlier, column purification and vacuum purification were carried out with this reaction solution.

As described so far, the block copolymer in which a block chain A3 composed from P-PME-1 and block chain B of polystyrene (PSt) were bonded in the order of B-A3-B was obtained.

The GPC analysis on this copolymer showed that it was a monodisperse polymer in which Mn was 149000. This copolymer will be abbreviated as "BL-1".

(2) Preparation of the Composition for Solid Polymer Electrolyte (3)

In an argon atmosphere, 2 g of (BL-1) was dissolved in 20 g of THF and by dissolving uniformly by further adding 0.21 g of LiClO$_4$ (hereinafter abbreviated as "LiPC"), the composition for a solid polymer electrolyte (3) was prepared.

(3) Preparation and Characteristic Evaluation of Solid Electrolyte Film

In an argon atmosphere, the abovementioned composition was flow-casted onto a polytetrafluoroethylene sheet and after being left for 24 hours at room temperature, was dried under reduced pressure at 60° C. for 5 hours and at 100° C. for further 10 hours to obtain a uniform solid electrolyte film (film thickness was 100 μm).

This solid electrolyte film was sandwiched between platinum plates under an argon atmosphere and the ionic conductivity measurements were carried out over a frequency range of 5 to 10 MHz by the complex impedance analysis using a Solartron 1260 impedance analyzer.

The results showed that the ionic conductivity was 6.3×$10^{-5}$ S/cm at 20° C., 1.7×$10^{-4}$ S/cm at 30° C., 3.8×$10^{-4}$ S/cm at 40° C., 6.4×$10^{-4}$ S/cm at 50° C., and 1.2×$10^{-3}$ S/cm at 60° C.

Comparative Example 2

(1) Synthesis of C-B-A3-B-C Block-Graft Copolymer

In an argon atmosphere, 0.1 mmol of dichlorotris(triphenylphosphine)ruthenium and 30 mmol of PME-1000 were added to 78 g of toluene, in which an argon degassing treatment was carried out in advance, and after mixing them uniformly, 0.4 mmol of di-n-butylamine and 0.2 mmol of 2,2-dichloroacetophenone were added thereto and by heating to 80° C. while stirring, a polymerization reaction was initiated.

22 hours after the initiation of the polymerization reaction, the temperature of the reaction system was cooled down to 0° C. to stop the polymerization reaction. The results of GPC analysis on the reaction solution showed the polymerization conversion degree of PME-1000 was 50%. Then a metal complex and unreacted monomers were removed by carrying out the column purification of the reaction solution. Volatile components were removed under reduced pressure to obtain polyPME-1000 (hereinafter abbreviated as "P-PME-1"). The GPC analysis on the obtained P-PME-1 showed that it was a monodisperse polymer in which Mn was 83000.

Subsequently, in an argon atmosphere, 0.04 mmol of CPS, 0.2 mmol of P-PME-1, 17 mmol of St, and 5 mmol of n-octane were added to 43 g of toluene, in which a degassing treatment was carried out in advance, and after mixing them uniformly, 0.4 mmol of di-n-butylamine was added thereto and by heating to 100° C. while stirring, a copolymerization reaction was initiated.

45 hours after the initiation of the copolymerization reaction, the temperature of the reaction system was cooled down to 0° C. to stop the copolymerization reaction. The results of GC analysis on the polymerization-reaction solution showed that the polymerization conversion degree of St was 60%. As described earlier, column purification and vacuum purification were carried out with this reaction solution to isolate a polymer.

As described so far, the block copolymer in which a block chain A3 composed from P-PME-1 and block chain B of polystyrene (PSt) were bonded in the order of B-A3-B was obtained.

The GPC analysis on this copolymer showed that it was a monodisperse polymer in which Mn was 88000. This copolymer will be abbreviated as "PSt-b-P-PME-1-b-PSt". This copolymer was a polymer which had the same composition as that of the aforementioned BL-1.

Subsequently, in an argon atmosphere, 0.04 mmol of CPS, 0.2 mmol of PSt-b-P-PME-1-b-PSt, 9 mmol of 2-hydroxyethyl acrylate (hereinafter abbreviated as "HEA"), and 5 mmol of n-octane were added to 45 g of toluene, in which a degassing treatment was carried out in advance, and after mixing them uniformly, 0.4 mmol of di-n-butylamine was added thereto and by heating to 80° C. while stirring, a copolymerization reaction was initiated. 22 hours after the initiation of the copolymerization reaction, the temperature of the reaction system was cooled down to 0° C. to stop the copolymerization reaction. The results of GC analysis showed that the polymerization conversion degree of HEA was 40%. As described earlier, column purification and vacuum purification were carried out with this reaction solution.

As described so far, the block-graft copolymer in which a block chain A3 composed from P-PME-1, a block chain B composed from polystyrene, and a block chain C composed from a repeating unit of HEA were bonded in the order of C-B-A3-B-C was obtained.

The GPC analysis on the obtained copolymer showed that it was a monodisperse polymer in which Mn was 91000. In addition, when measured by $^{13}$C-NMR, the ratio of the number of moles of the PME-1000 repeating unit was 52%, the ratio of the number of moles of the St repeating unit was 35%, and the ratio of the number of moles of the HEA repeating unit was 13% with respect to the number of total moles of the repeating unit in the copolymer. The polymer obtained as described above will be abbreviated as "BL-2".

(2) Preparation of the Composition for Solid Polymer Electrolyte (4)

In an argon atmosphere, 2 g of (BL-2) and 0.04 g of TDI as a crosslinking agent were dissolved in 20 g of THF and by dissolving uniformly by further adding 0.21 g of LiClO$_4$, the composition for a solid polymer electrolyte (4) was prepared.

(3) Preparation and Characteristic Evaluation of Solid Electrolyte Film

In an argon atmosphere, the abovementioned composition was flow-casted onto a polytetrafluoroethylene sheet and after being left for 24 hours at room temperature, was dried under reduced pressure at 60° C. for 5 hours and at 100° C. for further 10 hours to obtain a uniform solid electrolyte film (film thickness was 100 μm).

This solid electrolyte film was sandwiched between platinum plates under an argon atmosphere and the ionic conductivity measurements were carried out over a frequency range of 5 to 10 MHz by the complex impedance analysis using a Solartron 1260 impedance analyzer.

The results showed that the ionic conductivity was $7.0 \times 10^{-5}$ S/cm at 20° C., $1.2 \times 10^{-4}$ S/cm at 30° C., $3.0 \times 10^{-4}$ S/cm at 40° C., $4.2 \times 10^{-4}$ S/cm at 50° C., and $6.3 \times 10^{-4}$ S/cm at 60° C.

Example 3

The B-A-B copolymers R-1 and R-2 and random copolymers P-PME/HEMA-1 and P-PME/HEMA-2 obtained in Examples 1 and 2 and 10 weight % tetrahydrofuran solution of TDI as a crosslinking agent, all in predetermined amounts, were mixed. The obtained mixtures were heated to produce respective copolymers for testing.

(1) Solvent Resistance Test of Copolymers

A mixture solvent of ethylene carbonate/diethylene carbonate (3/7, vol/vol) was prepared and 5 g of each of the copolymers for testing was left to stand in 100 ml of the mixed solvent to observe the solubility of copolymers. Testing conditions were: leaving to stand at room temperature; then heating to 80° C. for 1 hour; followed by leaving to stand overnight at room temperature.

The measurement results are summarized in Table 1 (A: insoluble, B: almost insoluble, C: partially soluble, D: soluble). Note that in Table 1, the crosslinking ratio shows the degree of crosslinking of the crosslinking point in the copolymers due to TDI.

TABLE 1

| Polymer | | Test conditions: temperature/time (h) | | |
|---|---|---|---|---|
| Name | Crosslinking ratio (%) | Leave to stand at room temperature | 80° C. 1 h | Room temperature 24 h |
| R-1 | 80 | A | A | A |
|  | 0 | B | D | D |
| R-2 | 90 | A | A | A |
|  | 0 | B | B | C |
| P-PME/HEMA-1 | 100 | B | B | B |
|  | 0 | B | B | B |
| P-PME-HEMA-2 | 100 | B | B | B |
|  | 0 | B | B | B |
| PVdF | — | A | A | A |

From Table 1, it is apparent that the crosslinked polymers of Examples 1 and 2 obtained in Example 3 have equivalent solvent resistance to those of the polymers of Comparative Examples (P-PME/HEMA-1, P-PME/HEMA-2, and PVdF (polyvinylidene fluoride)).

(2) Adhesion Test of Copolymers

In an argon atmosphere, 2 g of each of the B-A-B copolymers R-1 and R-2 obtained in Examples 1 and 2 and 0.15 g of TDI as a crosslinking agent were dissolved in 18 g of a mixed solvent of THF and acetonitrile (THF/acetonitrile=8 g/10 g) and they were uniformly dissolved by further adding 0.15 g of LiPF$_6$ thereto to prepare an adhesive-composition solution.

Moreover, 2 g of each of PVDF and the block copolymer of Comparative Example 1 (BL-1) were dissolved in 20 g of THF and they were uniformly dissolved by further adding 0.21 g of LiPF$_6$ thereto to prepare respective adhesive-composition solutions of Comparative Example.

Furthermore, 2 g of the block-graft copolymer of Comparative Example 2 (BL-2) and 0.04 g of TDI as a crosslinking agent were dissolved in 20 g of THF and they were uniformly dissolved by further adding 0.21 g of LiPF$_6$ thereto to prepare the adhesive-composition solution of Comparative Example.

Note that when mixing an electrolyte salt with an adhesive composition, the equivalence ratio of the electrolyte salt in a copolymer with respect to PEO ([Li]/[EO]) was 0.03.

Subsequently, the adhesive-composition solutions as obtained above were coated onto aluminum foil, and after pasting a microporous film made of polyethylene (PE) having a thickness of 20 μm thereon, the resultant was subjected to vacuum drying with heating (25° C.×0.5 h, 65° C.×4 h) to produce respective test specimens.

Each of the obtained test specimens was subjected to the tensile strength measurements at 25° C. and at a rate of 10 mm/min according to JIS K 6850; 1999.

The measurement results are summarized in Table 2 below.

In Table 2, the crosslinking ratio shows the degree of crosslinking of the crosslinking point in the copolymers due to TDI.

TABLE 2

| Name | Polymer composition | Crosslinking ratio (%) | Electrolyte salt | Rupture stress (MPa) |
|---|---|---|---|---|
| R-1 | PSt-b-P(PME400/HEMA)-b-PSt PME400/HEMA/St = 80/9/11 | 50 | — | 0.20 |
|  |  | 100 | — | 0.13 |
|  |  | 100 | LiPF$_6$ | 0.15 |
| R-2 | PSt-b-P(PME1000/HEMA)-b-PSt PME1000/HEMA/St = 77/8/15 | 50 | — | 0.19 |
|  |  | 100 | — | 0.18 |
|  |  | 100 | LiPF$_6$ | 0.20 |
| BL-1 | PSt-b-P(PME1000)-b-PSt PME1000/St = 86/14 | — | LiPF$_6$ | 0.03 |
| BL-2 | PHEA-b-PSt-b-P(PME1000)-b-PSt-b-PHEA PME1000/St/HEA = 52/35/13 | 50 | — | 0.11 |
|  |  | 100 | — | 0.11 |
|  |  | 100 | LiPF$_6$ | 0.08 |
| PVdF | — | — | — | 0.08 |

From Table 2, it was shown that in both cases where the crosslinked polymers of Examples 1 and 2 contained LiPF$_6$ and did not contain LiPF$_6$, they had excellent adhesive properties and larger rupture stress compared to that of the polymers of Comparative Examples (BL-1, BI-2, and PVdF).

INDUSTRIAL APPLICABILITY

The polymers of the present invention and crosslinked polymers which are formed by crosslinking these polymers are novel compounds and useful as materials for producing compositions for solid polymer electrolytes and solid polymer electrolytes.

The solid polymer electrolytes which are obtained from the compositions for solid polymer electrolytes of the present invention have excellent thermal characteristics, physical characteristics, and ionic conductivity.

In addition, the crosslinked polymers which are formed by crosslinking the polymers of the present invention have excellent adhesive performance and are useful as materials for fixing agents which bond/fix members such as electrode components.

The invention claimed is:

1. A polymer comprising:
a block chain A which is formed from a random copolymer containing a repeating unit (I) represented by formula (I)

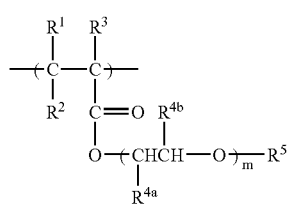

(I)

wherein R$^1$ to R$^3$ each independently represents hydrogen or C$_{1-10}$ hydrocarbon and R$^1$ and R$^3$ may bond to form a ring; R$^{4a}$ and R$^{4b}$ each independently represents hydrogen or methyl; R$^5$ represents hydrogen, hydrocarbon, acyl, or silyl; and m represents any integer of 1 to 100 and each R$^{4a}$ may be the same or different from one another and each R$^{4b}$ may be the same or different from one another when m is 2 or more; and a repeating unit (II) represented by the formula (II)

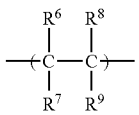

(II)

wherein R$^6$ and R$^8$ each independently represents hydrogen or C$_{1-10}$ hydrocarbon and R$^6$ and R$^8$ may bond to form a ring; R$^7$ represents hydrogen, C$_{1-10}$ hydrocarbon, hydroxyl, hydrocarbonoxy, carboxyl, acid anhydride, amino, ester, or an organic group having at least one functional group selected from the group consisting of hydroxyl, carboxyl, epoxy, acid anhydride, and amino; and R$^9$ represents an organic group having at least one functional group selected from the group consisting of hydroxyl, carboxyl, epoxy, acid anhydride, and amino; and a block chain B having a repeating unit (III) represented by the formula (III)

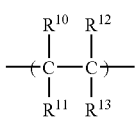

(III)

wherein R$^{10}$ to R$^{12}$ each independently represents hydrogen or C$_{1-10}$ hydrocarbon and R$^{13}$ represents aryl or heteroaryl; and wherein an arrangement order thereof is B, A, B.

2. The polymer according to claim 1, wherein the block chain A and block chain B are bonded and arranged in the order of B-A-B.

3. The polymer according to claim 1 wherein the degree of polymerization of the repeating unit (I) is 5 or more.

4. The polymer according to claim 1 wherein the degree of polymerization of the repeating unit (II) is 5 or more.

5. The polymer according to claim 1,
wherein the block chain A is formed from a random copolymer where the ratio of the number of moles of the repeating unit (I) and repeating unit (II) are within the range of 50 to 95% and 50 to 5%, respectively with respect to the total number of moles of repeating units in the block chain A.

6. The polymer according to claim 1,
wherein the ratio of the number of moles of the repeating units (I) and (II) summed up together is within the range of 10 to 80% and the ratio of the number of moles of the repeating units (III) is 90 to 20%, respectively with respect to the total number of moles of repeating units in the polymer.

7. The polymer according to claim 1,
wherein the number average molecular weight of the polymer is within the range of 5000 to 1000000.

8. The polymer according to claim 1,
wherein the repeating unit (II) is at least one repeating unit selected from the group consisting of a repeating unit (IV) represented by the formula (IV)

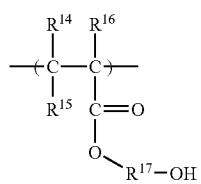
(IV)

wherein, $R^{14}$ to $R^{16}$ each independently represents hydrogen or $C_{1-10}$ hydrocarbon and $R^{14}$ and $R^{16}$ may bond to form a ring; $R^{17}$ represents $C_{1-6}$ alkylene, $C_{6-10}$ divalent aromatic hydrocarbon, $C_{3-10}$ divalent alicyclic hydrocarbon, or a divalent organic group in which these groups are combined; repeating unit (V) represented by the formula (V),

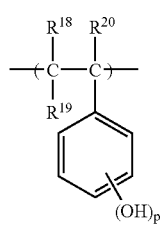
(V)

wherein $R^{18}$ to $R^{20}$ each independently represents hydrogen or $C_{1-10}$ hydrocarbon, and p represents any integer of 1 to 3; repeating unit (VI) represented by the formula (VI)

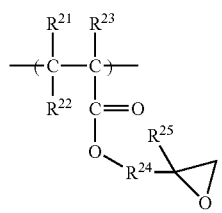
(VI)

wherein $R^{21}$ to $R^{23}$ each independently represents hydrogen or $C_{1-10}$ hydrocarbon and $R^{21}$ and $R^{23}$ may bond to form a ring; $R^{24}$ represents $C_{1-6}$ alkylene, $C_{6-10}$ divalent aromatic hydrocarbon, $C_{3-10}$ divalent alicyclic hydrocarbon, or a divalent organic group in which these groups are combined; and $R^{25}$ represents hydrogen or $C_{1-4}$ alkyl, and repeating unit (VII) represented by the formula (VII)

(VII)

wherein $R^{26}$ to $R^{28}$ each independently represents hydrogen or $C_{1-10}$ hydrocarbon and $R^{26}$ and $R^{28}$ may bond to form a ring; $R^{29}$ represents hydrogen or a functional group represented by the following formula (VIII)

$$-R^{30}-CO_2H \qquad (VIII)$$

wherein $R^{30}$ represents $C_{1-6}$ alkylene, $C_{6-10}$ divalent aromatic hydrocarbon, $C_{3-10}$ divalent alicyclic hydrocarbon, or a divalent organic group in which these groups are combined.

9. A crosslinked polymer which is obtained by the reaction between the polymer according to claim 1 and a crosslinking agent.

10. The crosslinked polymer according to claim 9, wherein the crosslinking agent is a polyisocyanate compound which has 2 or more isocyanate groups within a molecule or a polyepoxy compound which has 2 or more epoxy groups within the molecule.

11. The crosslinked polymer according to claim 9 which is obtained by reacting the polymer according to claim 1 with 0.01 to 2 moles of crosslinking agent with respect to 1 mole of the repeating unit (II) in the polymer.

12. A composition for a solid polymer electrolyte comprising:
the polymer according to claim 1 and
an electrolyte salt.

13. The composition for a solid polymer electrolyte according to claim 12, further comprising a crosslinking agent.

14. A solid polymer electrolyte comprising:
the polymer according to claim 1 or the crosslinked polymer according to claim 9; and
an electrolyte salt.

15. An adhesive composition comprising:
the polymer according to claim 1; and a crosslinking agent.

* * * * *